(12) United States Patent
Wallén

(10) Patent No.: US 12,241,522 B2
(45) Date of Patent: Mar. 4, 2025

(54) ADJUSTABLE BLEED VALVE ASSEMBLY FOR SHOCK ABSORBER

(71) Applicant: Öhlins Racing AB, Upplands Väsby (SE)

(72) Inventor: Magnus Wallén, Märsta (SE)

(73) Assignee: Öhlins Racing AB, Väsby (SE)

( * ) Notice: Subject to any disclaimer, the term of this patent is extended or adjusted under 35 U.S.C. 154(b) by 200 days.

(21) Appl. No.: 17/639,187

(22) PCT Filed: Aug. 20, 2020

(86) PCT No.: PCT/EP2020/073286
§ 371 (c)(1),
(2) Date: Feb. 28, 2022

(87) PCT Pub. No.: WO2021/043583
PCT Pub. Date: Mar. 11, 2021

(65) Prior Publication Data
US 2022/0397176 A1    Dec. 15, 2022

(30) Foreign Application Priority Data
Sep. 2, 2019 (EP) ..................................... 19194975

(51) Int. Cl.
*F16F 9/34* (2006.01)
*F16F 9/32* (2006.01)
(Continued)

(52) U.S. Cl.
CPC .............. *F16F 9/34* (2013.01); *F16F 9/3221* (2013.01); *F16F 9/466* (2013.01); *F16K 15/066* (2013.01);
(Continued)

(58) Field of Classification Search
CPC .... F16F 9/34; F16F 9/46; F16F 9/3221; F16F 9/466; F16F 2222/12; F16F 2228/066; F16F 2230/186; F16K 15/066; F16K 15/184
(Continued)

(56) References Cited

U.S. PATENT DOCUMENTS 2,410,716 A * 11/1946 Cook ...................... F16F 9/486
188/269
4,545,769 A * 10/1985 Nakahama ............. B63H 20/10
188/282.7
(Continued)

FOREIGN PATENT DOCUMENTS

DE          19542409 A1    5/1997

OTHER PUBLICATIONS

European Patent Office Extended Search Report dated Mar. 30, 2020 (6 pages).

*Primary Examiner* — Christopher P Schwartz
(74) *Attorney, Agent, or Firm* — Kagan Binder, PLLC

(57) ABSTRACT

The present disclosure relates to an adjustable bleed valve assembly for a shock absorber. The bleed valve assembly includes: a first adjustable bleed valve, and a second adjustable bleed valve arranged in series with the first adjustable bleed valve, wherein the first adjustable bleed valve and the second adjustable bleed valve are each pressure independently adjustable between a first open state and a second open state, wherein each adjustable bleed valve is adapted to throttle a damping fluid in the piston rod more in the second open state than in the first open state, wherein the first adjustable bleed valve and the second adjustable bleed valve are each adjustable between the first open state and the second open state independently from one another. An
(Continued)

adjustment device and a method for adjusting the bleed valve assembly is also provided.

20 Claims, 11 Drawing Sheets

(51) Int. Cl.
*F16F 9/46* (2006.01)
*F16K 15/06* (2006.01)
*G05D 15/00* (2006.01)
*F16K 15/18* (2006.01)

(52) U.S. Cl.
CPC .......... *G05D 15/00* (2013.01); *F16F 2222/12* (2013.01); *F16F 2228/066* (2013.01); *F16F 2230/186* (2013.01); *F16K 15/184* (2021.08)

(58) Field of Classification Search
USPC ...... 188/282.7, 282.8, 282.9, 322.13, 322.15
See application file for complete search history.

(56) References Cited

U.S. PATENT DOCUMENTS

| | | | | |
|---|---|---|---|---|
| 4,655,440 | A * | 4/1987 | Eckert | F16F 9/096 188/266.5 |
| 4,850,461 | A * | 7/1989 | Rubel | F16F 9/466 188/282.1 |
| 4,936,423 | A * | 6/1990 | Karnopp | B60G 17/08 188/266.5 |
| 5,123,671 | A | 6/1992 | Driessen | |
| 5,662,046 | A * | 9/1997 | Wright | F16F 9/512 105/198.3 |
| 5,996,748 | A * | 12/1999 | Nezu | F16F 9/46 188/266.5 |
| 6,394,238 | B1 * | 5/2002 | Rogala | F16F 9/3484 188/266.2 |
| 8,136,644 | B2 | 3/2012 | Soensteroed | |
| 8,651,251 | B2 * | 2/2014 | Preukschat | B60G 17/056 188/282.4 |
| 11,285,775 | B2 * | 3/2022 | Bergfeld | F16F 9/19 |
| 2013/0105260 | A1 | 5/2013 | Chen | |

* cited by examiner

ADJUSTABLE BLEED VALVE ASSEMBLY FOR SHOCK ABSORBER

CROSS-REFERENCE TO RELATED APPLICATIONS

This application is a national stage of, and claims priority to, Patent Cooperation Treaty Application No. PCT/EP2020/073286, filed Aug. 20, 2020, which claims priority to European Application No. EP 19194975.9, filed Sep. 2, 2019, both of which are hereby incorporated herein by reference in their entireties.

TECHNICAL FIELD

The present disclosure relates to a bleed valve assembly for a shock absorber and in particular an adjustable bleed valve assembly for a shock absorber.

BACKGROUND

Shock absorbers and damping systems are used for damping a relative movement between the wheel and the chassis of a vehicle, such as a car, a motorcycle or a bicycle. A conventional shock absorber normally comprises a working cylinder filled with a damping fluid, such as hydraulic oil or gas, and a piston head arranged on a piston rod movably arranged in the cylinder. The piston head is further commonly arranged to divide the cylinder into a first and second working chamber, i.e. a compression chamber and a rebound chamber, and moves in the cylinder against the resistance of the fluid, which in turn causes damping fluid to move in the damping cylinder. The shock absorber may be arranged between the vehicle chassis and the wheel to move telescopically as the vehicle travels along such that the movement of the wheel and vehicle is thus damped by the piston head moving in the cylinder against the resistance of the fluid.

Shock absorbers may comprise adjustable damping assemblies for controlling the damping force exerted due to the flow of fluid through the shock absorber so as to achieve different damping force characteristics. Such adjustable damping assemblies may include different types of valve arrangements.

A typical problem of adjustable damping assemblies, particular those arranged in piston rods, is that although the vehicle rider may want to adjust damping characteristics for the current driving conditions, the damping assemblies are usually cumbersome to adjust.

SUMMARY

Accordingly, it would be desirable to provide an adjustable damping assembly for a shock absorber, which alleviates some of the mentioned drawbacks of present solutions, and in particular an adjustable bleed valve assembly, i.e. a specific type of an adjustable damping assembly, adjustable such that a desirable and improved damping force characteristic may be achieved.

The disclosure is based on the inventor's realization that by fluidly arranging a bleed valve assembly comprising two serially connected bleed valves, which are independently adjustable, between a first and a second working chamber, i.e. a compression chamber and a rebound chamber, the damping force characteristics during compression strokes and rebound strokes can be independently adjusted. Moreover, such a solution can be adapted in shape and size so as to fit in a piston rod. Furthermore, it is based on the inventor's realization that an adjustable bleed valve assembly in a piston rod can be adjusted from an end of the shock absorber by means of longitudinally extending coupling members adapted to move within the piston rod.

The above-mentioned advantages are achieved by an adjustable bleed valve assembly, and a shock absorber comprising an adjustable bleed valve assembly. Moreover, an adjustment device for adjusting an adjustable bleed valve assembly is disclosed herein, which in addition alleviates some of the problems of existing solutions.

According to a first aspect of the disclosure, an adjustable bleed valve assembly for a shock absorber is provided. The adjustable bleed valve assembly may be adapted to be arranged in a bleed flow channel in a piston rod of the shock absorber. The adjustable bleed valve assembly may comprise a first adjustable bleed valve, and a second adjustable bleed valve arranged in series with the first adjustable bleed valve. The first adjustable bleed valve and the second adjustable bleed valve may each be pressure independently adjustable between a first open state and a second open state. Each adjustable bleed valve may be adapted to throttle a damping fluid in the piston rod more in the second open state than in the first open state. The first adjustable bleed valve and the second adjustable bleed valve may be adjustable between the first open state and the second open state independently from one another.

By bleed valve, it may refer to an element that comprises at least one bleed orifice through which the damping fluid may flow. Unlike e.g. shim stacks, bleed orifices do not change size in response to a change in pressure. Bleed orifices may however be changeable in size by other means, for instance by clicker adjustment means.

Hereby, the adjustable bleed valve assembly enables throttling of a damping fluid during compression strokes and rebound strokes to be adjusted independently from each other. By this, the damping force characteristics during compression strokes and rebound strokes may be adjusted independently. Moreover, by this, novel damping force characteristics during compression strokes and rebound strokes may be achieved. This also facilitates the adjustments for the rider, as the adjustments of the rebound damping does not affect the compression damping and vice versa.

In the context of the application, "adjustable" should be understood as an object A being reconfigurable during use, and "adjusted" should be understood as an object A being reconfigured during use.

Moreover, in the context of the application, "pressure independently adjustable" should be understood as an object A being reconfigurable during use independently from a pressure acting on the object A.

In the context of the application, "arranged in series" should be understood as an object A and an object B being arranged such that they are fluidly coupled to each other. The wording "fluidly coupled" should be understood as an object A being coupled to an object B by any coupling means, also referred to as a "coupling device," such as a channel, pipe, hose or other connection through which a fluid may flow. The coupling may be direct coupling or it may be indirect coupling. Also, in the context of the application, an object A being "fluidly arranged between" objects B and C should be understood as that the placing of object A is between object B and object C, in the fluid path running between objects B and C. Thus, object A does not need to be "fluidly arranged" as in floating.

In the context of the application, "open state" should be understood as an object A being configured to allow damping fluid to flow through it. Also, "closed state" should be understood as an object A being configured to prevent a damping fluid to flow through it.

In the context of the application, "compression stroke direction" should be understood as the movement direction of the piston head when it moves towards the compression chamber. Also, "rebound stroke direction" should be understood as the movement direction of the piston head when it moves towards the rebound chamber.

In the context of the application, a "bleed flow channel" should be understood as a channel, e.g. in a piston rod, fluidly coupling a first working chamber and a second working chamber, e.g. a compression chamber and a rebound chamber. It may be a channel extending in general in a direction parallel to the longitudinal extension of the piston rod. It may be a channel extending through a piston head arranged to the piston rod.

The adjustable bleed valve assembly may be arranged in a shock absorber so that the first adjustable bleed valve is fluidly arranged between a compression chamber and the second adjustable bleed valve. The adjustable bleed valve assembly may be arranged in a shock absorber so that the second adjustable bleed valve is fluidly arranged between a rebound chamber and the first adjustable bleed valve.

According to one embodiment, the first adjustable bleed valve or the second adjustable bleed valve may be adjustable between the first open state and the second open state from a distance. Both the first adjustable bleed valve and the second adjustable bleed valve may be adjustable between the first open state and the second open state from a distance.

Hereby, the first adjustable bleed valve and/or the second adjustable bleed valve may be adjusted even if the bleed valve assembly is arranged in a shock absorber in such a way wherein the first adjustable bleed valve and the second adjustable bleed valve are inaccessible by a user. By enabling the first adjustable bleed valve, the second adjustable bleed valve, or both to be adjustable from a distance, the adjustable bleed valve assembly may be more compactly built and the process of adjusting the damping valve assemblies may be facilitated.

The first adjustable bleed valve, or the second adjustable bleed valve or both may be adapted to be adjusted from a distance as follows. The adjustable bleed valve assembly may be adapted such that the first adjustable bleed valve, the second adjustable bleed valve, or both may couple to adjusting means, also referred to as "adjustment device," enabling adjustment of the first adjustable bleed valve, the second adjustable bleed valve or both between the first open state and the second opened state. Such adjusting means may be mechanical, such as adjustment knobs, screws, bolts etc. that may be arranged to be accessible from an exterior of the shock absorber, and which when actuated moves an adjustable bleed valve between the first open state and the second open state, or between an open state and a closed state. The adjusting means may be electric actuators adapted to, when actuated, adjust an adjustable bleed valve between the first open state and the second open state. The electric actuator may be adapted to be remote controlled, either wired or wirelessly. The electric motor may be electrically connected to a battery for supplying power to the electric actuator. The battery may be removably arranged in a shock absorber such that it can be replaced if necessary.

For instance, the adjustment means may be clicker adjustment means. According to one embodiment, the first adjustable bleed valve and the second adjustable bleed valve may be adapted to throttle a damping fluid by means of a common throttling member. The first adjustable bleed valve may be adjusted between the first and second open state when moving the throttling member. The second adjustable bleed valve may be adjusted between the first and second open state when moving the throttling member.

The throttling member may have an elongated shape. At least a portion of the throttling member may be cylindrical in shape. The throttling member may be formed so as to define one or more longitudinal openings close to or located at each respective longitudinal ends of the throttling member. Each of the one or more longitudinal openings may be fluidly connected by one or more channels extending along the throttling member. The throttling member may define one or more channels along which a damping fluid may flow. The throttling member may define one or more interior channels along which a damping fluid may flow. The throttling member may be adapted to fluidly couple the first adjustable bleed valve and the second adjustable bleed valve, so that a damping fluid may flow through the first adjustable bleed valve, the throttling member, and the second adjustable bleed valve. The throttling member may be directly connecting the first adjustable bleed valve and the second adjustable bleed valve fluidically.

Hereby, the throttling member may be adapted to guide a damping fluid between the first adjustable bleed valve and the second adjustable bleed valve.

Said one of the first adjustable bleed valve and the second adjustable bleed valve may be adapted to interact with at least one of the longitudinal openings of the throttling member. Here, "interact" may mean that an adjustable bleed valve engages with the at least one of the longitudinal end openings of the throttling member, so as to regulate a damping fluid flow flowing through the adjustable bleed valve assembly.

The interaction between said one of the first adjustable bleed valve and the second adjustable bleed valve and the at least one of the longitudinal end openings of the throttling member may impact how much the damping fluid is throttled when flowing through said one of the first adjustable bleed valve and the second adjustable bleed valve.

The throttling member may serve as a component fluidly coupling the first adjustable bleed valve in series with the second adjustable bleed valve.

Alternatively, or in combination with said one or more interior channels, the throttling member may define one or more exterior channels together with the inside walls of a bleed flow channel in a shock absorber, along which one or more exterior channels a damping fluid may flow between the first adjustable bleed valve and the second adjustable bleed valve.

According to one embodiment, the throttling member may comprise two axially displaced throttling member portions, coupled to each other by one or more distance members, wherein said one or more longitudinal openings of the throttling member are provided on each throttling member portions. Said one of the first adjustable bleed valve and the second adjustable bleed valve may be adapted to engage with one of the throttling member portions. The one or more distance members may be rods. In case a plurality of distance members is incorporated, the plurality of distance members may be arranged in a formation so as to provide stability between the two throttling member portions. Such a formation may be an equidistant arrangement as measured from a central longitudinal axis.

According to one alternative embodiment, the adjustable bleed valve assembly may comprise two separate throttling members, each throttling member adapted to moveably engage with the first and second adjustable bleed valves respectively to control the throttling of the damping fluid thereof. The two separate throttling members may be adapted to move freely with respect to each other.

According to one embodiment, the first adjustable bleed valve may comprise a first bleed valve member adapted to interact with the throttling member such that at least a portion of one or more bleed flow throttling openings associated with the first adjustable bleed valve is covered. Hereby, the first adjustable bleed valve may be adjusted in a compact manner.

In the context of the application, a "bleed flow throttling opening" should be understood as an opening through which a damping fluid normally flows past the throttling member and an adjustable bleed valve. Moreover, an open state of an adjustable bleed valve may be defined as a state wherein the one or more bleed flow throttling openings associated with said adjustable bleed valve is not fully covered by the throttling member.

Moreover, a closed state of an adjustable bleed valve may be defined as a state wherein all of the one or more bleed flow throttling openings associated with said adjustable bleed valve are covered by the throttling member.

The first adjustable bleed valve may comprise a first base member. The first bleed valve member may extend out of the first base member. The first bleed valve member may have an elongated shape, wherein an end of the elongated shape is coupled to the first base member. The opposite end of the first bleed valve member may be adapted to engage with the throttling member. The first bleed valve member may be cylindrical. The first bleed valve member may be adapted to be adjustably inserted into one or more longitudinal openings of the throttling member, by which adjustable insertion, the one or more bleed flow throttling openings may be adjustably covered.

The one or more bleed flow throttling openings associated with the first adjustable bleed valve may be arranged on the first bleed valve member. The one or more bleed flow throttling openings may be arranged on the valve member. The valve member may comprise a major longitudinal opening located at the end of the valve member adapted to be inserted into the throttling member. The one or more bleed flow openings may be arranged along the circumferential on the valve member so as a damping fluid may flow through the major longitudinal opening into the valve member and out of the valve member via the one or more bleed flow openings.

Alternatively, the one or more bleed flow throttling openings associated with the first adjustable bleed valve may be arranged on the throttling member. The one or more bleed flow openings may be arranged along the circumferential of the throttling member at each end, respectively. A damping fluid may flow through the one or more bleed flow openings at each end of the throttling member, respectively, wherein the damping fluid flow is throttled by the adjustable bleed valve assembly by the relative positioning of the throttling member to each adjustable bleed valve.

The one or more bleed flow throttling openings associated with the first adjustable bleed valve may be arranged circumferentially of the first bleed valve member or the throttling member. The one or more bleed flow throttling openings may be two or more, and they may be arranged symmetrically. The one or more bleed flow throttling openings may be mesh openings, or elongated slots, or may have other suitable shapes.

The first adjustable bleed valve may be adapted to make said interaction with the throttling member by means of direct or indirect contact. Moreover, the first adjustable bleed valve may be adapted to make said interaction with the throttling member by means of a translative motion, either in a direction parallel with a longitudinal axis of the throttling member or in a direction perpendicular to the longitudinal axis of the throttling member, or partially in both directions. Moreover, the first adjustable bleed valve may be adapted to make said interaction with the throttling member by means of a rotational motion, either such that the rotational axis of said rotational movement is in parallel with a longitudinal axis of the throttling member or perpendicular to the longitudinal axis of the throttling member, or by means of a rotational motion such that the rotational axis is aligned partially in parallel and partially perpendicularly to a longitudinal axis of the throttling member.

According to one embodiment, the second adjustable bleed valve may comprise a second bleed valve member adapted to interact with the throttling member such that it adjustably covers at least a portion of one or more bleed flow throttling openings associated with the second adjustable bleed valve. Hereby, the second adjustable bleed valve may be adjusted in a compact manner.

The second bleed valve member may comprise a second base member. The second bleed valve member may extend out of the base member. The valve member may have an elongated shape, wherein an end of the elongated shape is coupled to the base member. The opposite end of the valve member may be adapted to engage with the throttling member. The valve member may be cylindrical. The valve member may be adapted to be inserted into a longitudinal end opening of the throttling member. The valve member of the second bleed valve member may be adapted to interact with an opposite longitudinal end opening of the throttling member as compared to the first valve member of the first bleed valve member.

The one or more bleed flow throttling openings associated with the second adjustable bleed valve may be arranged on the second bleed valve member. The second bleed valve member may be adapted to be inserted into the throttling member. The one or more bleed flow openings may be arranged along the circumferential on the valve member so as a damping fluid may flow through the major opening into the valve member and out of the valve member via the one or more bleed flow openings.

Alternatively, the one or more bleed flow throttling openings associated with the second adjustable bleed valve may be arranged on the throttling member. The one or more bleed flow throttling openings associated with the second adjustable bleed valve may be arranged circumferentially of the second bleed valve member or the throttling member. The one or more bleed flow throttling openings may be two or more, and they may be arranged symmetrically.

The second adjustable bleed valve may be adapted to make said interaction with the throttling member by means of direct or indirect contact. Moreover, the second adjustable bleed valve may be adapted to make said interaction with the throttling member by means of a translative motion, either in a direction parallel with a longitudinal axis of the throttling member or in a direction perpendicular to the longitudinal axis of the throttling member, or partially in both directions. Moreover, the second adjustable bleed valve may be adapted to make said interaction with the throttling member by means of a rotational motion, either such that the rotational axis of said rotational movement is in parallel with a longitudinal axis of the throttling member or perpendicular to the longitudinal axis of the throttling member, or by means of a rotational motion such that the rotational axis is aligned partially in parallel and partially perpendicularly to a longitudinal axis of the throttling member.

According to one embodiment, the throttling member may be held fixed relative the first bleed valve member when the second adjustable bleed valve is adjusted between the first open state and the second open state.

Hereby, the adjustment of the second adjustable bleed valve between the first open state and the second open state does not impact the relative positioning of the throttling member to the first adjustable bleed valve.

According to one embodiment, the second bleed valve member may be held fixed relative the throttling member when the first adjustable bleed valve is adjusted between the first open state and the second open state.

Hereby, the adjustment of the first adjustable bleed valve between the first open state and the second open state does not impact the relative positioning of the second adjustable bleed valve to the throttling member.

According to one embodiment, the throttling member may be coupled to a first adjusting means by means of a first coupling member adapted to enable adjustment of the position of the throttling member relative the first bleed valve member. The first coupling member may be adapted to extend longitudinally through the piston rod. The throttling member may be adapted to be coupled to the first coupling member. The first coupling member may be adapted to couple to a circumferential ridge of the throttling member. The first coupling member may be shaped as a sleeve and may define a longitudinally extending channel in the sleeve. The first coupling member may be a telescopic component.

The first coupling member may comprise two portions adapted to rotatably engage with each other by means of a rotation coupling wherein a relative rotation between a first portion and a second portion of the two portions of the first coupling member is translated into a relative linear motion between the first portion and the second portion. Hereby, an axial length along the rotational axis of the first coupling member may be increased or decreased.

The rotation coupling may be provided by threads arranged on one of the first and second portion of the first coupling member and a helical thread ridges provided on the other of the first and second portion, which helical thread ridges are adapted to engage with said threads.

According to one embodiment, the second bleed valve member may be coupled to a second adjusting means by means of a second coupling member adapted to enable adjustment of the position of the second bleed valve member relative to the throttling member. The second coupling member may be adapted to extend longitudinally through the piston rod. The second coupling member may be adapted to be coupled to the second bleed valve member. The second coupling member may be adapted to be coupled to the second base member of the second bleed valve member.

The second coupling member may be a telescopic component. The second coupling member may comprise two portions adapted to rotatably engage with each other by means of a rotation coupling wherein a relative rotation between a first portion and a second portion of the two portions of the second coupling member is translated into a relative linear motion between the first portion and the second portion. Hereby, an axial length along the rotational axis of the second coupling member may be increased or decreased. The rotation coupling may be provided by threads arranged on one of the first and second portion of the first coupling member and a helical thread ridges provided on the other of the first and second portion, which helical thread ridges are adapted to engage with said threads.

According to one embodiment, the second bleed valve member may be slidably arranged in the first coupling member. As an alternative, the first bleed valve member may be slidably arranged in the second coupling member. Hereby, the bleed valve assembly may be more compactly built. Further, anyone of the first or second coupling member may be slidably arranged in the other one of the first or second coupling member. The second coupling member may be adapted to slide longitudinally in the second coupling member. Hereby, the first coupling member and the second coupling member may thus define an outer coupling member and an inner coupling member. Either one of the first or second coupling members may constitute the outer coupling member, and consequently the other one being the inner coupling member.

According to one embodiment, the throttling member, the first bleed valve member and the second bleed valve member may be concentrically arranged. Hereby, the bleed valve assembly may be more compactly built. Moreover, moving components of the bleed valve assembly may be less prone to get stuck.

According to one embodiment, the bleed valve assembly may comprise a rebound check valve adapted to open at a predetermined damping fluid pressure during rebound. Hereby, pressure buildup beyond a predetermined pressure level in the bleed valve assembly may be prevented during rebound strokes.

The rebound check valve may be fluidly arranged in parallel with one of the first adjustable bleed valve and the second adjustable bleed valve.

The rebound check valve may be fluidly arranged in parallel with the first adjustable bleed valve. The rebound check valve may be fluidly arranged in parallel with the second adjustable bleed valve.

The rebound check valve may comprise a rebound check valve cap and a spring adapted to bias the rebound check valve cap so that it keeps an auxiliary rebound flow path closed.

In the context of the application, an auxiliary flow path should be understood as a damping fluid flow path branching from a bleed flow path, i.e. the path of the bleed flow through the one or more bleed flow throttling openings. The auxiliary flow path may be adapted to be opened or closed in response to a change in pressure. The auxiliary flow path may be adapted to be opened or closed in response to when a damping fluid pressure exceeds or falls below a predetermined pressure level.

The auxiliary rebound flow path may extend through the base member of said one of the first adjustable bleed valve and the second adjustable bleed valve. The rebound check valve may be arranged such that the spring biases the rebound check valve cap toward the base member of said one of the first adjustable bleed valve and the second adjustable bleed valve. The spring may bias the rebound check valve cap in contact with the base member.

According to one embodiment, the bleed valve assembly may comprise a compression check valve adapted to open at a predetermined damping fluid pressure during compression. Hereby, pressure buildup beyond a predetermined pressure level in the bleed valve assembly may be prevented during compression strokes.

The compression check valve may be fluidly arranged in parallel with one of the first adjustable bleed valve and the second adjustable bleed valve. The compression check valve may be fluidly arranged in parallel with the first adjustable bleed valve. The compression check valve may be fluidly arranged in parallel with the second adjustable bleed valve.

The compression check valve may comprise a compression check valve cap and a spring adapted to bias the compression check valve cap so that it keeps an auxiliary compression flow path closed. The auxiliary compression flow path may extend through the base member of said one of the first adjustable bleed valve and the second adjustable bleed valve. The compression check valve may be arranged such that the spring biases the compression check valve cap toward the base member of said one of the first adjustable bleed valve and the second adjustable bleed valve. The spring may bias the compression check valve cap in contact with the base member.

According to one embodiment, the rebound check valve or the compression check valve respectively may be adapted to open from an open state to a further open state. The bleed valve assembly may be adapted such that either the auxiliary compression flow path, or the auxiliary rebound flow path is not fully closed whenever a pressure is below the predetermined pressure level. Rather, the rebound check valve or the compression check valve may thus be adapted to open in response to a pressure equal to or exceeding the predetermined pressure level, such that an increased ratio of damping fluid flows through the corresponding auxiliary flow path.

According to one embodiment, the first adjustable bleed valve or the second adjustable bleed valve may be adapted to be adjusted between a closed state and an open state. Both the first adjustable bleed valve and the second adjustable bleed valve may be adapted to be adjusted between a closed state and an open state. Such an embodiment may be advantageous if the piston rod structurally defines a bleed flow channel extending at least partly around the adjustable bleed valve assembly. By adjusting either the first or the second adjustable bleed valve into a closed state, the bleed flow may be significantly throttled.

According to a second aspect of the disclosure, an adjustment device for adjusting the adjustable bleed valve assembly is provided. The adjustment device may comprise a first adjusting means, also referred to as a "first adjusting device," for adjusting the first adjustable bleed valve. The adjustment device may comprise a second adjusting means, also referred to as a "second adjusting device," for adjusting the second adjustable bleed valve. The adjustment device may be arranged outside the working cylinder of the shock absorber. The adjustment device may be arranged at a longitudinal end of the piston rod.

The first adjusting means may be adapted to couple to the first adjustable bleed valve. The first adjusting means may be adapted to couple to the first adjusting bleed valve by means of the first coupling member. The first adjusting member may be adapted to move relative the working cylinder of the shock absorber, by which movement it actuates a movement of the first coupling member which in turn adjusts the first adjustable bleed valve between the first open state and the second open state or between a closed state and an open state. Said actuating movement of the first adjusting means may be a rotation and/or a translation. The first adjusting means may be adapted to rotatably actuate the movement of the first coupling member.

The second adjusting means may be adapted to couple to the second adjustable bleed valve. The second adjusting means may be adapted to couple to the second adjusting bleed valve by means of the second coupling member. The second adjusting member may be adapted to move relative the working cylinder of the shock absorber, by which movement it actuates a movement of the second coupling member which in turn adjusts the second adjustable bleed valve between the first open state and the second open state or between a closed state and an open state. Said actuating movement of the second adjusting means may be a rotation and/or a translation. The second adjusting means may be adapted to rotatably actuate the movement of the first coupling member.

The first adjusting means and/or the second adjusting means may comprise a worm wheel, and a rotatable member arranged to rotatably engage with said worm wheel. A rotational movement of the rotatable member may thus be transferred as a rotational movement of said worm wheel. The rotatable member may be arranged so that a user may interact with it from the outside.

The adjustment device may comprise incremental steps for increasing and/or decreasing the throttling of at least one of the first and second throttling member. The adjustment device may comprise a feedback means, also referred to as a "feedback device," for indicating each incremental step to a user adjusting the first and/or second throttling member. Such feedback may be achieved by for example a click from a spring-and-ball assembly or grooves and projections interacting upon adjustments.

According to a third aspect of the disclosure, the above-mentioned objects are achieved by a shock absorber comprising the bleed valve assembly. The shock absorber may comprise a piston rod comprising a bleed flow channel. The shock absorber may comprise a bleed valve assembly according to the first aspect of the disclosure, or any embodiments thereof. The bleed valve assembly may be arranged in said bleed flow channel.

Moreover, the piston rod may extend into the working cylinder of the shock absorber through a first end of the working cylinder. The working cylinder may define a working chamber therein. The working chamber may be divided by the piston into a first and second working chamber, i.e. a compression chamber and a rebound chamber. The rebound chamber may be the part of the working chamber in-between the piston and the end of the working cylinder through which the piston rod extends through. The compression chamber may be the part of the working chamber in-between the piston and the opposing end of the working cylinder.

The shock absorber may comprise an adjustment device according to the second aspect of the disclosure. The adjustment device may be arranged outside the working cylinder of the shock absorber. The adjustment device may be arranged to an end of the piston rod arranged to move outside the working cylinder of the shock absorber.

According to a fourth aspect of the disclosure, a method of adjusting the adjustable bleed valve assembly is provided. The method may comprise a step of adjusting at least one of the first and second adjustable bleed valve between the first open state and the second open state, or between an open state and a closed state, so as to achieve a desired damping force characteristic during compression strokes and/or rebound strokes.

According to one embodiment, the method may comprise a step of adjusting both the first and second adjustable bleed valves between the first open state and the second open state, or between an open state and a closed state, respectively, so as to achieve a desired damping force characteristic during compressions strokes and/or rebound strokes.

According to one embodiment, the method may comprise a step of adjusting the first and second adjustable bleed valves between the first open state and the second open state, or between an open state and a closed state, respectively, independently from each other.

According to one embodiment, the method may comprise a step of moving a throttling member relative a first bleed valve member of the first adjustable bleed valve so as to adjustably cover at least a portion of one or more bleed flow throttling openings associated with the first adjustable bleed valve.

According to one embodiment, the method may comprise a step of moving a second bleed valve member of the second adjustable bleed valve relative the throttling member so as to adjustably cover at least a portion of one or more bleed flow throttling openings associated with the second adjustable bleed valve.

According to one embodiment, wherein the step of moving either the throttling member or the second bleed valve member involves a translation along a longitudinal axis of adjustable bleed valve assembly and/or a rotation about the longitudinal axis of the adjustable bleed valve assembly.

According to one embodiment, the method may comprise a step of adjusting the first adjustable bleed valve between the first open state and the second open state, or between an open state and a closed state, by moving a first coupling member arranged in the piston rod.

According to one embodiment, the method may comprise a step of adjusting the second adjustable bleed valve between the first open state and the second open state, or between an open state and a closed state, by moving a second coupling member arranged in the piston rod.

According to one embodiment, wherein the second coupling member is moveably arranged in the first coupling member.

According to one embodiment, the method may comprise a step of opening a compression check valve at a predetermined damping fluid pressure. According to one embodiment, the method may comprise a step of opening a rebound check valve at a predetermined damping fluid pressure.

According to one embodiment, the method may comprise a step of holding the throttling member fixed relative the first bleed valve member of the first adjustable bleed valve when adjusting the second adjustable bleed valve.

According to one embodiment, the method may comprise a step of holding the second bleed valve member fixed relative the throttling member when adjusting the first adjustable bleed valve.

According to one embodiment, the method may comprise a step of moving the first coupling member by means of a first adjusting means.

According to one embodiment, the method may comprise a step of moving the second coupling member by means of a second adjusting means.

According to one embodiment, the method may comprise a step of controlling an adjustment device for controlling the first adjusting means and/or the second adjusting means.

Further objectives of, features of, and advantages of the present disclosure will become apparent when studying the following detailed disclosure, the drawings and the appended claims. Those skilled in the art realize that different features of the present disclosure can be combined to create embodiments other than those described in the following.

The bleed valve assembly above has been described to be adapted in shape and size so as to fit in in a piston rod. However, it may be adapted in shape and size so as to be arranged at other locations in a shock absorber to fluidly couple the compression chamber and the rebound chamber. The bleed valve assembly may be adapted in shape and size so as to be arranged outside the shock absorber to fluidly couple the compression chamber and the rebound chamber.

Moreover, the disclosures of the first aspect, the second aspect, the third aspect and the fourth aspect herein disclosed are so closely related so that characteristics and/or functions of a particular element described in reference to a first aspect of the disclosure may be understood to be inherited by an element named the same or similar thereof in relation to a second aspect of the disclosure. Hence, elements of disclosures from one aspect may be understood to be disclosed in relation to the disclosures in accordance of the other aspects. Hereby, also any combination of features from the aspects are covered by the inventive concept as long as the features are compatible with each other.

The disclosure is defined by the appended independent claims, with some embodiments being set forth in the appended dependent claims, in the following description and in the drawings.

BRIEF DESCRIPTION OF THE DRAWINGS

The disclosure will in the following be described in more detail in the non-limiting detailed description of example embodiments, with reference to the enclosed drawings, wherein.

DETAILED DESCRIPTION

Figure 1:
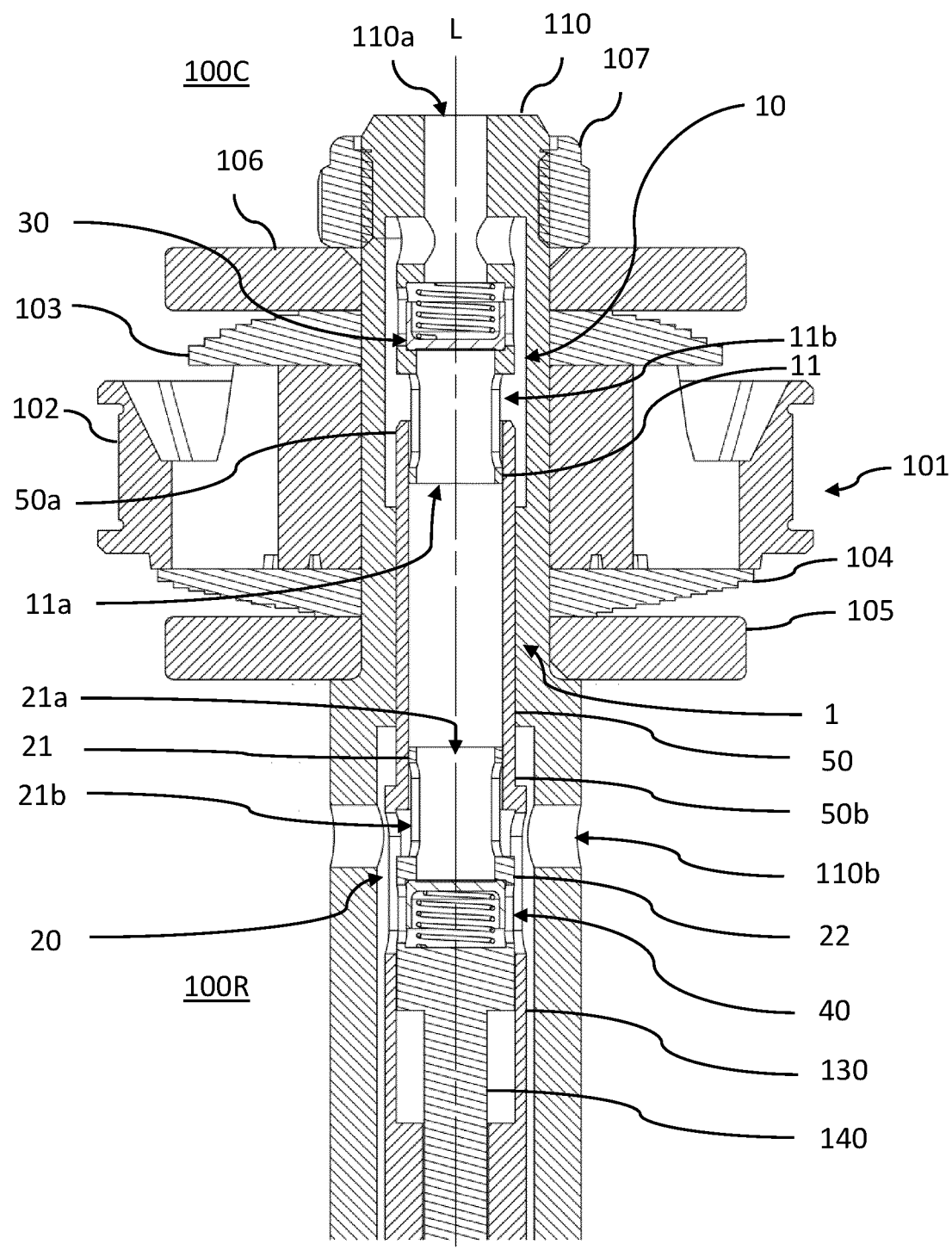
FIG. 1 shows a cross sectional view of an adjustable bleed valve assembly arranged in a piston rod, according to one embodiment of the disclosure.

The present disclosure will be described more fully hereinafter with reference to the accompanying drawings, in which example embodiments of the disclosure are shown.

This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like numbers refer to like elements. Moreover, all figures are schematic, not necessarily to scale, and generally only show parts which are necessary in order to elucidate the disclosure, wherein other parts may be omitted or merely suggested.

FIG. 1 shows a cross sectional view of an adjustable bleed valve assembly 1 arranged in a piston rod 110, according to one embodiment of the disclosure. The piston rod 110 is adapted to move in a working cylinder (not shown). A piston head 101 is arranged on the piston rod 110, which piston head 101 is secured in place by a locking nut 107 adapted to engage with grooves at the end of the piston rod 110. The piston head 101 divides the working chamber into a compression chamber 100C and a rebound chamber 100R. The piston head 101 comprises a base structure 102 which structurally defines one or more channels connecting the compression chamber 100C and the rebound chamber 100R, thereby enabling a damping fluid flow between the compression chamber 100C and the rebound chamber 100R. On each side of the base structure, shims 103, 104 are located. The shims 103, 104 are adapted to close, in an unflexed position, at least a portion of the one or more channels of the base structure 102 of the piston head 101, and, in a flexed position, allowing an increased flow between the compression chamber 100C and the rebound chamber 100R, thereby regulating the damping fluid flow between the compression chamber 100C and the rebound chamber 100R during compression strokes and rebound strokes, respectively. The shims 103, 104 are each sandwiched in-between the base structure 102 and a corresponding place 105, 106, respectively.

Moreover, the piston rod 110 structurally defines a bleed flow channel extending along a longitudinal axis L of the piston rod 110, which bleed flow channel fluidly connects the compression chamber 100C and the rebound chamber 100R by means of a compression chamber opening 110a and a plurality of rebound chamber openings 110b. The compression chamber opening 110a is located at a longitudinal end of the piston rod 110 on a compression side of the piston head 101. The plurality of rebound chamber openings 110b are located on the piston rod 110 on a rebound side of the piston head 101.

Figure 2:
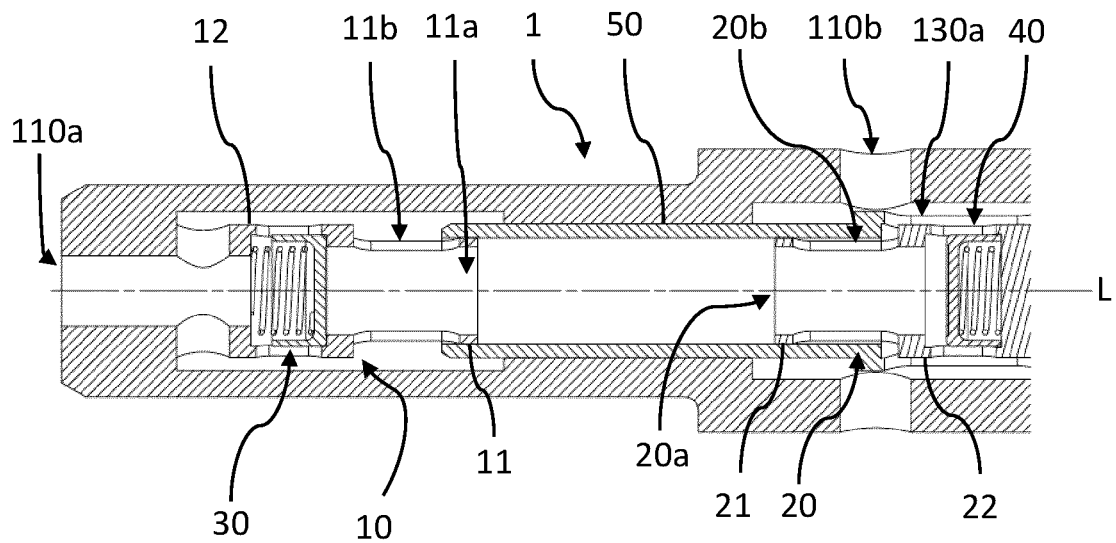
FIG. 2 shows a cross sectional view of an adjustable bleed valve assembly according to one embodiment of the disclosure.

The bleed valve assembly 1 according to one embodiment of the present disclosure is shown in FIG. 2 more clearly. It structurally defines a bleed flow channel P adapted for guiding a damping fluid between a first opening and a second opening of the bleed valve assembly 1 (see FIG. 3). Moreover, the bleed valve assembly 1 is adapted in shape and size to be arranged in a bleed flow channel in a piston rod 110 as herein detailed, so that the damping fluid in the bleed flow channel flows through the bleed valve assembly 1.

Hence, the adjustable bleed valve assembly 1 is adapted to guide, when arranged in the bleed flow channel of the piston rod 110, a damping fluid through the adjustable bleed valve assembly 1 between the compression chamber 100C and the rebound chamber 100R during compression and rebound strokes.

The adjustable bleed valve assembly 1 comprises a first adjustable bleed valve 10 and a second adjustable bleed valve 20. The first adjustable bleed valve 10 and the second adjustable bleed valve 20 are arranged in series. Specifically, the bleed valve assembly 1 is arranged in the bleed flow channel so that the first adjustable bleed valve 10 is fluidly arranged between the compression chamber 100C and the second adjustable bleed valve 20. The second adjustable bleed valve 20 is fluidly arranged between the rebound chamber 100R and the first adjustable bleed valve 10.

The first adjustable bleed valve 10 comprises a first bleed valve member 11 and a first base member 12. Both the first bleed valve member 11 and the first base member 12 have cylindrical shapes, wherein the first bleed valve member 11 has a smaller diameter than the first base member 12. The first bleed valve member 11 and the first base member 12 are coaxially arranged to each other. Similarly, the second adjustable bleed valve 20 comprises a second bleed valve member 21 and a second base member 22. Both the second bleed valve member 21 and the second base member 22 have cylindrical shapes, wherein the second bleed valve member 21 has a smaller diameter than the second base member 22. The second bleed valve member 21 and the second base member 22 are coaxially arranged to each other.

The adjustable bleed valve assembly 1 comprises a throttling member 50. The throttling member 50 has a cylindrical shape and is provided with a first end opening located at a first longitudinal end 50a of the throttling member 50. Furthermore, the throttling member 50 is provided with a second end opening located at a second longitudinal end 50b of the throttling member 50. The first adjustable bleed valve 10 and the second adjustable bleed valve 20 are arranged on opposite sides of the throttling member 50. The first adjustable bleed valve 10, the second adjustable bleed valve 20 and the throttling member 50 are arranged concentrically along a longitudinal axis of the throttling member 60.

The first bleed valve member 11 of the first adjustable bleed valve 10 is adapted to interact with the throttling member 60 such that at least a portion of one or more bleed flow throttling openings 11b associated with the first adjustable bleed valve 10 is covered. As can be seen in FIGS. 1 and 2, the one or more bleed flow throttling openings 11b associated with the first adjustable bleed valve 10 are arranged on the first bleed valve member 11 of the first adjustable bleed valve 10.

Likewise, the second bleed valve member 21 of the second adjustable bleed valve 20 is adapted to interact with the throttling member 50 such that at least a portion of one or more bleed flow throttling openings 21b associated with the second adjustable bleed valve 20 is covered. As can be seen in FIGS. 1 and 2, the one or more bleed flow throttling openings 21b associated with the second adjustable bleed valve 20 are arranged on the second bleed valve member 21 of the second adjustable bleed valve 20.

Moreover, the bleed valve assembly 1 comprises a rebound check valve 30 and a compression check valve 40. The rebound check valve 30 is arranged in the first base member 12 of the first adjustable bleed valve 10. The compression check valve 40 is arranged in the second base member 22 of the second adjustable bleed valve 20.

The first adjustable bleed valve 10, the second adjustable bleed valve 20, and the throttling member 50 are adapted to be independently moveable relative each other. By this, a novel damping force characteristic may be achieved, see FIGS. 10 and 11.

Figure 3:
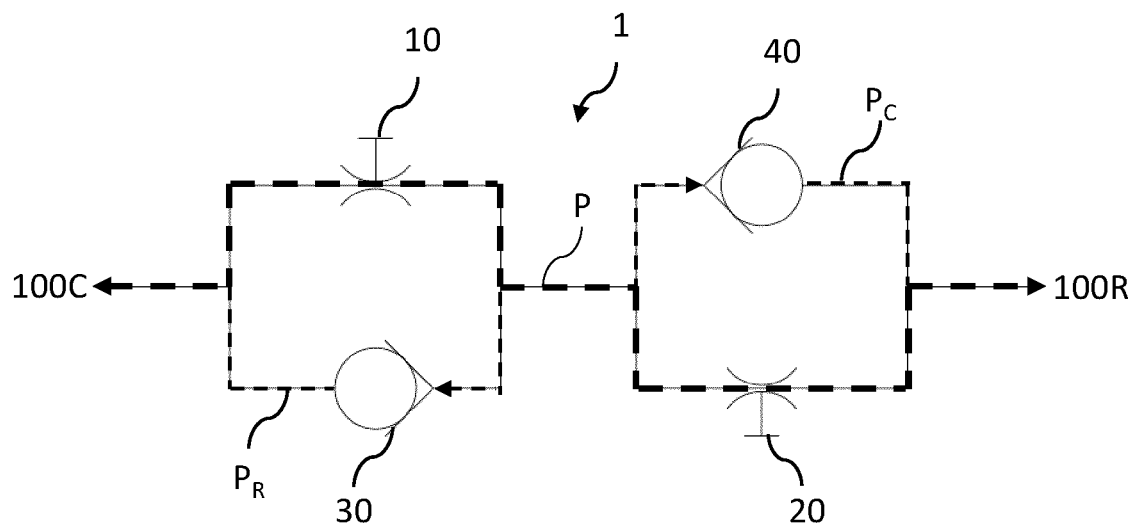
FIG. 3 shows a flow diagram of an adjustable bleed valve assembly according to one embodiment of the disclosure.

FIG. 3 shows a flow diagram of the adjustable bleed valve assembly 1 presented in FIG. 2 according to one embodiment of the disclosure. Assuming a compression stroke is taking place, the bleed flow will flow through the bleed valve assembly 1 along the bleed flow path P in a direction from the compression chamber 100C toward the rebound chamber 100R. First, the bleed flow flows through the first adjustable bleed valve 10 and then through the second adjustable bleed valve 20 before reaching the rebound chamber 100R.

The compression check valve 40 is fluidly arranged in parallel with the second adjustable bleed valve 20 and is adapted to keep an auxiliary compression flow path $P_C$ closed unless the pressure of the damping fluid acting on the compression check valve 40 equals or exceeds a predetermined opening pressure level, in which case it opens, allowing a portion of the damping fluid to flow along the auxiliary compression flow path $P_C$, in parallel with a portion of the bleed flow path P.

Now, assuming a rebound stroke is taking place, the bleed flow will flow through the bleed valve assembly 1 along the bleed flow path P in a direction from the rebound chamber 100R toward the compression chamber 100C. First, the bleed flow flows through the second adjustable bleed valve 20 and then through the first adjustable bleed valve 10 before reaching the compression chamber 100C.

The rebound check valve 30 is fluidly arranged in parallel with the first adjustable bleed valve 10 and is adapted to keep an auxiliary rebound flow path $P_R$ closed unless the pressure of the damping fluid acting on the rebound check valve 30 equals or exceeds a predetermined opening pressure level, in which case it opens, allowing a portion of the damping fluid to flow along the auxiliary rebound flow path $P_R$, in parallel with a portion of the bleed flow path P.

Figure 4:
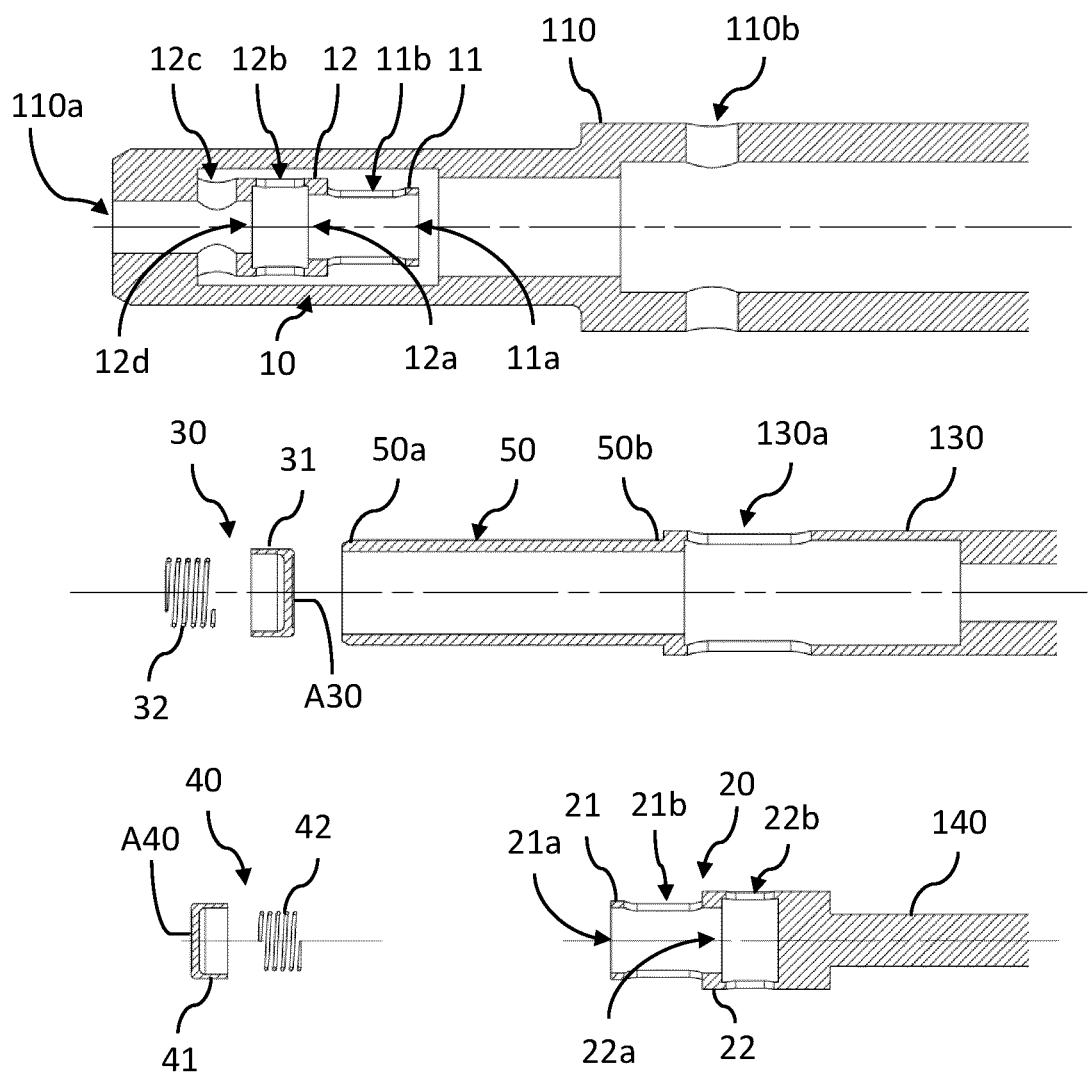
FIG. 4 shows a cross sectional view of an exploded view of an adjustable bleed valve assembly according to one embodiment of the disclosure.

FIG. 4 shows an exploded cross-sectional view of the adjustable bleed valve assembly 1 according to one embodiment of the disclosure. In the following, a more detailed description of each of the components of the bleed valve assembly 1 is provided. As can be seen in FIG. 4, the first adjustable bleed valve 10 is coaxially arranged in the bleed flow channel of the piston rod 110. In particular, the first base member 12 of the first adjustable bleed valve 10 is fixedly arranged to the inside of the piston rod 110, and the first bleed valve member 11 extends out of the first base member 12 further into the bleed flow channel in the piston rod 110. The first bleed valve member 11 structurally defines a central opening 11a located at the longitudinal end of the cylindrical body facing away from the first base member 12. The central opening 11a leads into a cylindrical cavity inside the first bleed valve member 11. Along the cylindrical wall of the first bleed valve member 11, a plurality of bleed flow throttling openings 11b is arranged, in this case two bleed flow throttling openings 11b. These are arranged on opposite sides of the valve member 11.

The first base member 12 comprises a first cylindrical cavity, which is at least partly bounded at each longitudinal end of the cylindrical cavity by protrusions of the first base member 12. A plurality of auxiliary flow path openings 12b is arranged along the cylinder wall of this first cylindrical cavity, and more precisely, two auxiliary flow path openings 12b are arranged along this cylindrical wall. Moreover, these are arranged on opposing sides of the cylinder wall.

In connection to this first cylindrical cavity, a second cylindrical cavity is arranged. The first base member 12 is so structurally adapted so that the second cylindrical cavity is coaxially arranged with the first cylindrical cavity. Two bleed flow channels 12c extend into the first base member into the second cylindrical cavity.

The rebound check valve 30 comprises a rebound check valve cap 31 and a rebound check valve spring 32. The rebound check valve 30 is adapted to be arranged in the first cylindrical cavity of the first base member 12 of the first adjustable bleed valve 10. The rebound check valve spring 32 is adapted to bias the rebound check valve cap 31 toward the first bleed valve member 11 of the first adjustable bleed valve 10 so that the central opening 12a is closed. The rebound check valve spring 32 is adapted with such a spring spiral diameter so that a first longitudinal end abuts protrusions in the first cylindrical cavity of the first base member 12 while the opposite longitudinal end of the rebound check valve spring 32 abuts the rebound check valve cap 31. When arranged in the first adjustable bleed valve 10, the rebound check valve cap 31 is biased by the rebound check valve spring 32 toward the first bleed valve member 11, so that it engages with protrusions of the first base member 12, thereby closing the central opening 12a of the first adjustable bleed valve. When the rebound check valve 30 is in a closed position, a surface on the rebound check valve cap 31, having area A30, is exposed as seen from the cylindrical cavity of the valve member 11.

The throttling member 50 comprises a cylindrical body having a first longitudinal end 50a and a second longitudinal end 50b. The throttling member 50 is coaxially arranged to the first coupling member 130, which will be detailed more at a later section of this detailed description. The first coupling member 130 structurally defines a cylindrical cavity for receiving the second adjustable bleed valve 20. Two bleed flow openings 130a are arranged opposite each other along the cylindrical wall of the cylindrical cavity of the first coupling member 130, which fluidly connects the cylindrical cavity with the outside of the first coupling member 130.

The second adjustable bleed valve 20 comprises a second bleed valve member 21 and a second base member 22. The second adjustable bleed valve 20 is coaxially arranged to the second coupling member 140. In particular, the second base member 22 of the second adjustable bleed valve 20 is fixedly arranged to the second coupling member 140, and the second bleed valve member 21 extends out of the second base member 22 away from the second coupling member 140. The valve member 21 structurally defines a bleed flow opening 21a located at the longitudinal end of the cylindrical body facing away from the second base member 22. The bleed flow opening 21a leads into a cylindrical cavity inside the second bleed valve member 21. Along the cylindrical wall of the second bleed valve member 21, a plurality of bleed flow throttling openings 21b is arranged, in this case two bleed flow throttling openings. These are arranged on opposite sides of the valve member 21.

The second base member 22 of the second adjustable valve 20 comprises a single cylindrical cavity, which is at least partly bounded at each longitudinal end of the cylindrical cavity by means of protrusions. A plurality of auxiliary flow path openings 22b is arranged along the cylinder wall of this first cylindrical cavity, and more precisely, two auxiliary flow path openings 22b are arranged along this cylindrical wall. Moreover, these are arranged on opposing sides of the cylinder wall.

The compression check valve 40 comprises a compression check valve cap 41 and a rebound check valve spring 42. The compression check valve 40 is adapted to be arranged in the single cylindrical cavity of the base member 22 of the second adjustable bleed valve 20. The compression check valve spring 42 is adapted to bias the compression check valve cap 41 toward the second bleed valve member 21 of the second adjustable bleed valve 20 so that a central opening 22a is closed. The compression check valve spring 42 is adapted with such a spring spiral diameter so that a first longitudinal end abuts a base in the single cylindrical cavity of the base member 22 while the opposite longitudinal end of the compression check valve spring 42 abuts the compression check valve cap 41. When arranged in the second adjustable bleed valve 20, the compression check valve cap 41 is biased by the compression check valve spring 42 toward the second bleed valve member 21, so that it engages with protrusions of the second base member 22, thereby closing the central opening 22a of the second adjustable bleed valve 20. When the compression check valve 40 is in a closed position, a surface on the compression check valve cap 41, having area A40, is exposed as seen from the cylindrical cavity of the valve member 21.

The throttling member 50 is adapted to be coaxially arranged to the first adjustable bleed valve 10, so that it interacts with the first bleed valve member 11. Moreover, the throttling member 50 is adapted to be moved in position relative the first adjustable bleed valve 10 so that it adjustably covers the one or more bleed flow throttling openings 11b located on the first bleed valve member 11. By moving the throttling member 50 in a longitudinal direction, the portion of covered bleed flow throttling openings 11b on the first bleed valve member 11 may be changed. The second adjustable bleed valve 20 is adapted to be coaxially arranged relative the throttling member 50, so that the second bleed valve member 21 interacts with the throttling member 50. Moreover, the second adjustable bleed valve 20 and the second coupling member 140 are adapted to be at least partly arranged in the first coupling member 130.

FIGS. 5a-5d show the working principle of the first adjustable bleed valve 10 of the adjustable bleed valve assembly 1, according to one embodiment of the disclosure, as seen in cross sectional view. Although being somewhat structurally different in some embodiments, the second adjustable bleed valve 20 (not shown) works in a similar manner.

Figure 5A:
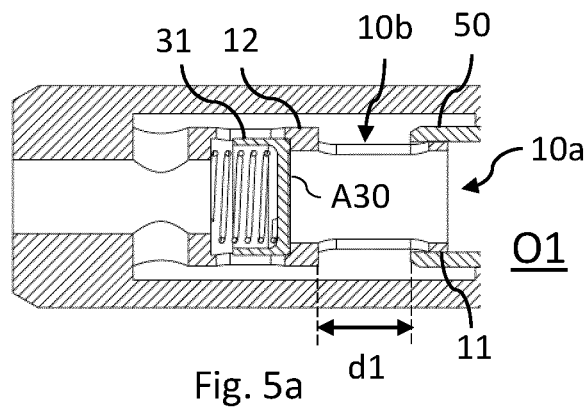
FIG. 5a-5d show the working principle of an adjustable bleed valve of the adjustable bleed valve assembly, according to one embodiment of the disclosure, as seen in cross sectional view.

As seen in the FIG. 5a, the first adjustable bleed valve 10 is in a first open state O1, at which state the throttling member 50 allows for an increased flow or a maximum flow through the plurality of bleed flow throttling openings 11b on the first bleed valve member 11. In this first open state O1, the throttling member 50 is in a position such that the first longitudinal end 50a of the throttling member 50 is placed a first distance d1 away from the base member of the first adjustable bleed valve 10.

Figure 5B:
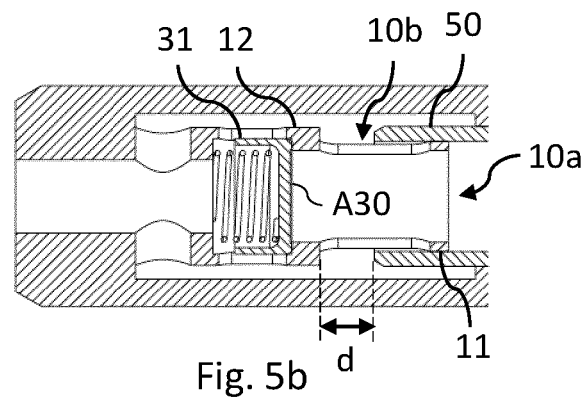

In FIG. 5b, the first longitudinal end 50a of the throttling member 50 is moved closer to the first base member 12 of the adjustable bleed valve 10, such that the first longitudinal end 50a of the throttling member 60 is placed a distance d away from the first base member of the first adjustable bleed valve 10, wherein the distance d is less than the first distance d1. Consequently, the throttling member 50 covers a greater portion of the plurality of bleed flow throttling openings 11b on the first bleed valve member 11.

Figure 5C:
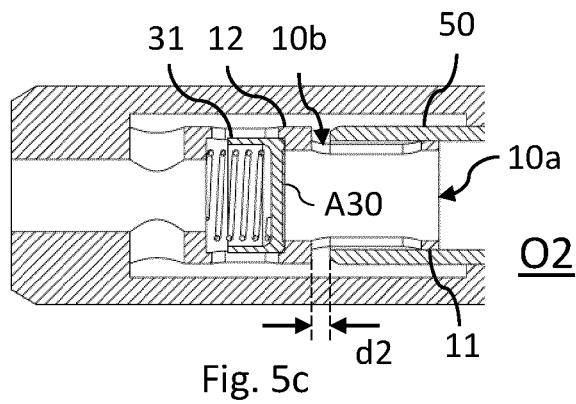

In FIG. 5c, the first adjustable bleed valve 10 is in the second open state O2, at which state the first adjustable bleed valve 10 throttles the bleed flow in the piston rod 110 more than in the first open state O1. The first longitudinal end 50a of the throttling member 50 is at a position where it is a second distance d2 away from the first base member of the first adjustable bleed valve 10, which second distance d2 is less than the distance d. Consequently, the throttling member 50 covers an even greater portion of the plurality of bleed flow throttling openings 11b on the valve member 11.

Figure 5D:
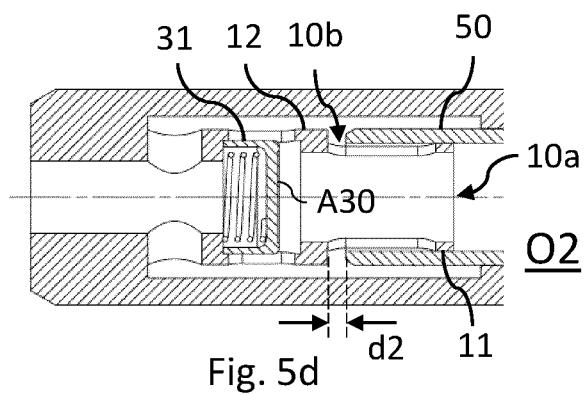

Depending on the damping fluid pressure, the rebound check valve spring 32 may be unable to withstand the resulting force acting on the exposed area A30 of the rebound check valve cap 31 due to the bleed flow pressure. Hence, the rebound check valve 30 may open at the predetermined opening pressure level, as shown in FIG. 5d, thereby allowing a portion of the bleed flow to flow along the auxiliary rebound flow path $P_R$ through the central opening 12a of the first adjustable bleed valve 10, thereby relieving the pressure of the bleed flow.

Figure 6A:
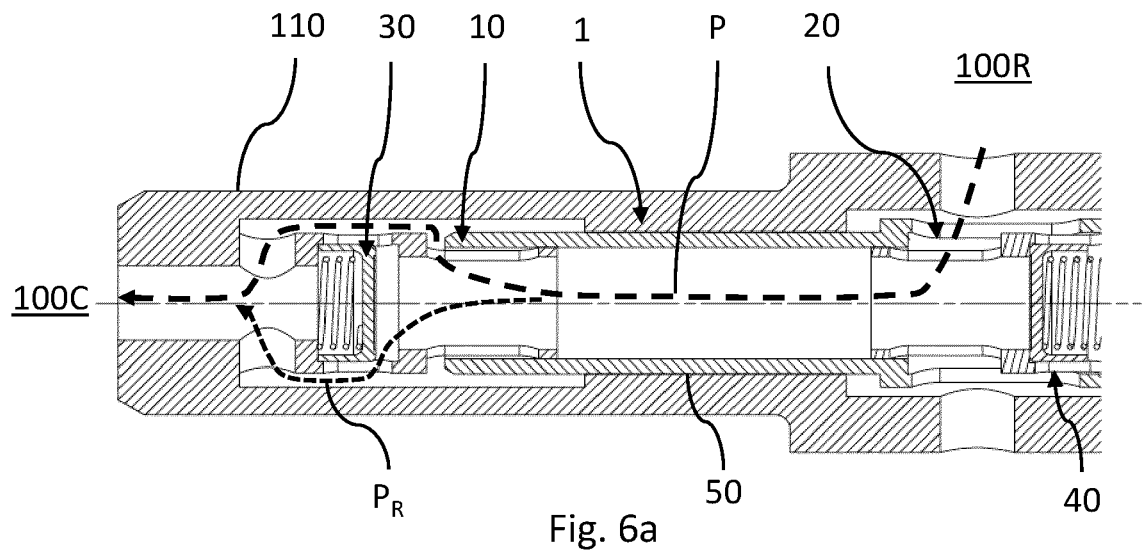
FIG. 6a-6b show the working principle of the adjustable bleed valve assembly according to one embodiment of the disclosure, as seen in cross sectional view.
Figure 6B:
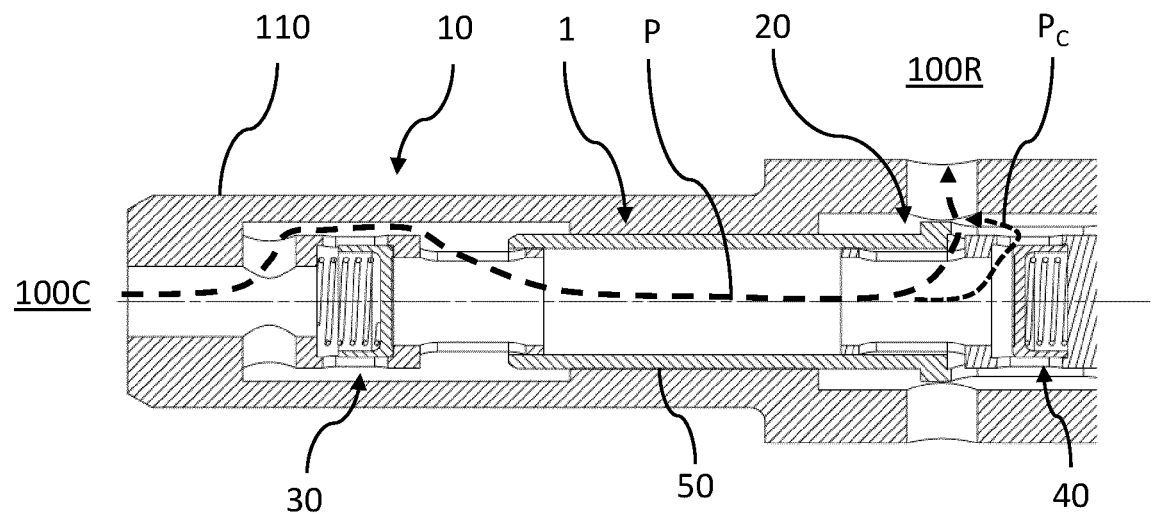

FIGS. 6a, 6b show the working principle of the adjustable bleed valve assembly 1 according to one embodiment of the disclosure, as seen in cross sectional view. As is shown in FIG. 6, the bleed flow path P is as follows: starting from the compression chamber opening 110a, it continues into the second cylindrical cavity of the first base member 12, then continues through the bleed flow channels 12c, then along the piston bleed flow channel, then the bleed flow path P continues into the one or more bleed flow throttling openings 11b and through the bleed flow opening 11a into the throttling member 50. The bleed flow path P then continues into the bleed flow opening 21a of the second bleed valve member 21 into the second bleed valve member 21, then through the one or more bleed flow throttling openings 21b, through the bleed flow openings 130a of the first coupling member and then finally through the rebound chamber openings 110b.

During a compression stroke, the damping fluid flows as shown in FIG. 6a. During a rebound stroke, the damping fluid flows as shown in FIG. 6b. Moreover, the auxiliary rebound flow path $P_R$ is shown in FIG. 6a. The auxiliary rebound flow path $P_R$ is as follows: starting from the central opening 12a of the first adjustable bleed valve 10, it continues into the first cylindrical cavity of the first base member 12, then continues through the auxiliary flow path openings 12b and then joins the bleed flow path P.

Moreover, the auxiliary compression flow path $P_C$ is shown in FIG. 6b. The auxiliary compression flow path $P_C$ is as follows: starting from the central opening 22a of the second adjustable bleed valve 20, it continues into the single cylindrical cavity of the second cavity 22, then continues through the auxiliary flow path opening 22b and then joins the bleed flow path P.

Figure 7:
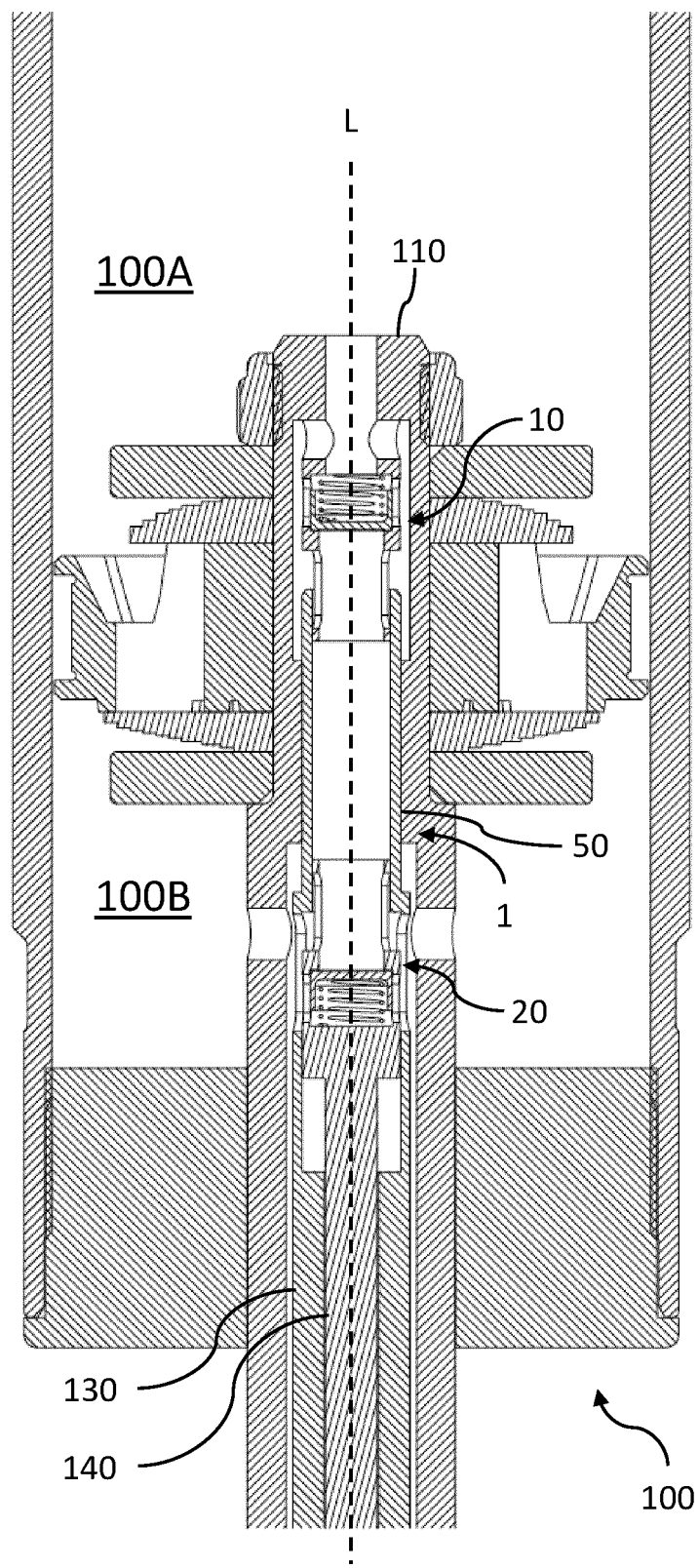
FIG. 7 shows a portion of a shock absorber, comprising an adjustable bleed valve assembly, according to one embodiment of the disclosure.

FIG. 7 shows a portion of a shock absorber, comprising an adjustable bleed valve assembly 1, according to one embodiment of the disclosure. The bleed valve assembly 1 is arranged in the bleed flow channel of the piston rod 110 and operates during compression strokes and rebound strokes as herein previously discussed in relation to the FIGS. 1-6b. The first adjustable bleed valve 10 is adjusted between the first open state O1 and the second open state O2 by moving the first coupling member 130 in a longitudinal direction, either away from or toward the first adjustable bleed valve 10. The second adjustable bleed valve 20 is adjusted between the first open state O1 and the second open state O2 by moving the second coupling member 140 in a longitudinal direction along the longitudinal axis L, either away from or toward the throttling member 50.

Figure 8:
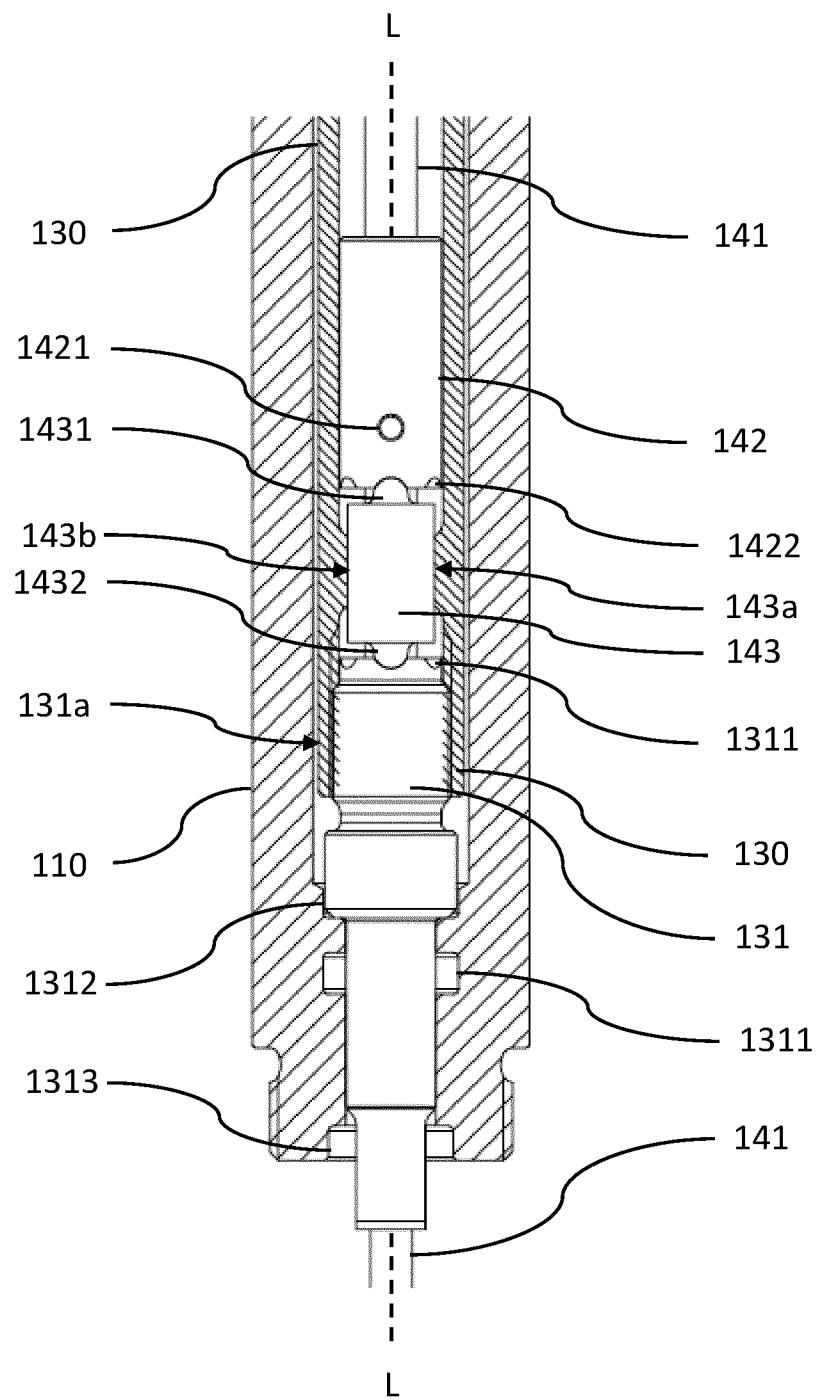
FIG. 8 shows a cross sectional view of the first and second coupling member according to one embodiment of the disclosure.

FIG. 8 shows a cross sectional view of adjustment means, also referred to as "adjustment device," for adjusting the adjustable bleed valve assembly 1 according to one embodiment of the disclosure. The adjustment means comprise a first coupling sleeve 131, a second coupling sleeve 142, and an intermediate coupling sleeve 143, and an adjustment rod 141, which are all, at least partly, arranged inside the first coupling member 130.

Starting with the first coupling sleeve 131, it is arranged to rotate about the longitudinal axis L to rotatably engage with the first coupling member 130. They do so by means of screw threads 131a and corresponding screw grooves. When rotating the first coupling sleeve 131 about the longitudinal axis L relative the piston rod, the first coupling sleeve 131 is screwed into or out of the first coupling member 130, depending on direction. Moreover, the first coupling sleeve 131 is rotatably arranged in the piston rod 110 at a fixed longitudinal position, by means of protrusions 1311, 1312, 1313 which engage with corresponding cavities in the piston rod 110. By this, the first coupling member 130 consequently moves along the longitudinal axis L, in an upward or downward direction as seen in FIG. 8, when rotating the first coupling sleeve 131. Hereby, the throttling member 50 of the adjustable bleed valve assembly 1 is adjusted in position which in turn affects the throttling of the first adjustable bleed valve 10.

The adjustment rod 141 is arranged to rotatably engage with the second coupling means 140, also referred to as "second coupling device 140," by means of screw threads 131a and corresponding screw grooves (not shown in FIG. 8). Moreover, the adjustment rod 141 extends through the first coupling sleeve 131 and is adapted to freely rotate about the longitudinal axis L without causing the first coupling sleeve 131 to rotate relative the piston rod 110. Hence, when rotating the adjustment rod 141 about the longitudinal axis L, the second bleed valve member 21 is adjusted in position relative the throttling member, thereby adjusting the throttling of the second adjustable bleed valve 20.

Moreover, the adjustment means are further adapted to provide predetermined incremental step of adjusting the first adjustable bleed valve 10 and the second adjustable bleed valve 20. This is achieved by the adjustment means as shown in FIG. 8 in the following way.

The adjustment rod 141 and the second coupling sleeve 142 are rotatably locked with one another by means of a pin 1421 which is arranged to extend through the second coupling sleeve 142 and the adjustment rod 141. Moreover, due to the damping fluid pressure, which in some embodiments may be about 12 bar, the adjustment rod 141 is pushed into a downward direction, in other words, it is in a sense "spring"-biased in a downward direction as seen in FIG. 8.

Also, in-between the first coupling sleeve 131 and the second coupling sleeve 142, the intermediate coupling sleeve 143 is arranged. The intermediate coupling sleeve 143 is adapted to be rotationally interlocked with the first coupling member 130, while also being adapted to slide relative the first coupling member 130 along the longitudinal axis L. This is achieved by providing the intermediate coupling sleeve with two opposing flat surfaces 143a 143b which engage with corresponding flat inner wall portions of the first coupling member 130.

The intermediate coupling member 143 is adapted to releasably engage with the first coupling sleeve 131 and the second coupling sleeve 142 by means of a plurality of protrusions 1431, 1432 adapted to engage with corresponding cavities 1311, 1422 located on the first coupling sleeve 131 and the second coupling sleeve 142, respectively. This in combination with the spring-biased adjustment rod 141 establishes the incremental step function. When rotating the first coupling sleeve 131 about the longitudinal axis L, the intermediate coupling sleeve 143 is pushed upward as the first coupling sleeve 131 disengages with the intermediate coupling sleeve, which in turn causes the second coupling sleeve 142 and the adjustment rod 141 in an upward direction also, until the protrusions 1432 of the intermediate coupling sleeve 143 engages with a new set of cavities of the cavities 1311 of the first coupling sleeve 131. Likewise, when rotating the adjustment rod 141 and the second coupling sleeve 142, the adjustment rod 141 is pushed upward as the second coupling sleeve 142 disengages from the intermediate coupling sleeve 143, until the protrusions 1431 of the intermediate coupling sleeve 143 engages with a new set of cavities of the cavities 1422 of the second coupling sleeve 142.

Figure 9:
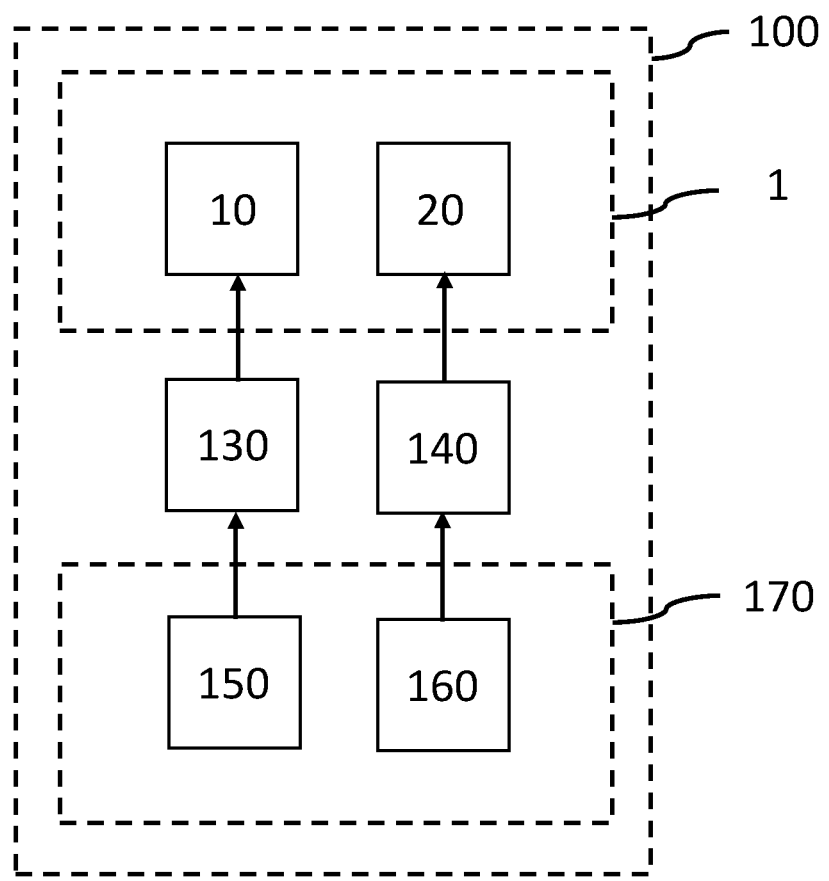
FIG. 9 shows a block diagram of the disclosure according to one embodiment of the present disclosure.

FIG. 9 shows a block diagram of the disclosure disclosed herein according to one embodiment thereof. As previously explained, the bleed valve assembly 1 comprises a first adjustable bleed valve 10 and a second adjustable bleed valve 20. The bleed valve assembly 1 may be incorporated into a shock absorber 100 as previously explained. The first adjustable bleed valve 10 is adjustable from a distance by means of a first coupling member 130. The second adjustable bleed valve 140 is adjustable from a distance by means of a second coupling member 140. A first adjusting means 150, also referred to as "first adjusting device 150," is coupled to the first adjustable bleed valve 10 by means of the first adjusting means 150. A second adjusting means 160, also referred to as "second adjusting device 160," is coupled to the second adjustable bleed valve 20 by means of the second adjusting means 160. By controlling the first adjusting means 150, the first coupling member 130 can be controlled so as to adjust the first adjustable bleed valve 10 between the first open state O1 and the second open state O2. Likewise, by controlling the second adjusting means 160, the second coupling member 140 can be controlled so as to adjust the second adjustable bleed valve 20 between the first open state O1 and the second open state O2. The first coupling member 130 and the second coupling member 140 may be incorporated into the shock absorber 100. The first adjusting means 150 and the second adjusting means 160 may be incorporated into the shock absorber. The first adjusting means 150 and the second adjusting means 160 may be incorporated into an adjustment device 170. The first adjusting means 150 and the second adjusting means 160 may be worm wheels fixated to the first coupling member 130 and the second coupling member 140. The adjustment device 170 may comprise independent rotatable member for engaging with the first adjusting means 150 and the second adjusting means 160, which rotatable members may be accessible from an outside of the adjustment device 170.

The adjustable bleed valve assembly 1 may be adjustable in terms of compression damping parameter C and rebound damping parameter R, which are related to the level of throttling of the first adjustable bleed valve 10 and the second adjustable bleed valve 20. A lower value of said compression damping parameter C and rebound damping parameter R indicates an increased throttling of the damping fluid in compression and rebound respectively. Hence, by adjusting the throttling of the first adjustable bleed valve 10 and/or the second adjustable bleed valve 20, the compression damping parameter C and/or the rebound damping parameter R consequently changes.

Figure 10:
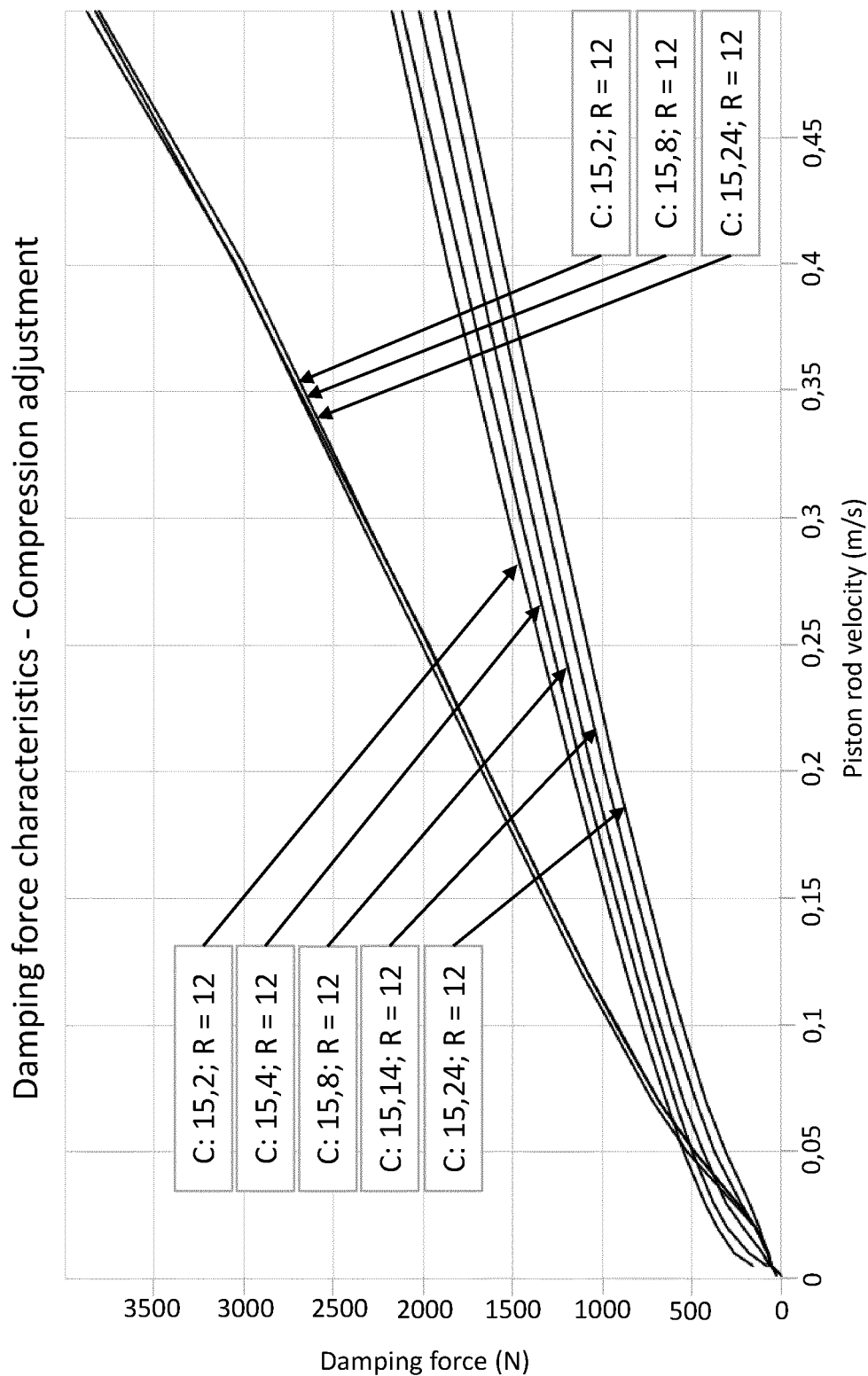
FIG. 10 shows damping force characteristics during compression strokes and rebound strokes in relation to compression adjustments of the adjustable bleed valve according to one embodiment of the disclosure.

FIG. 10 shows damping force characteristics during compression strokes and rebound strokes in relation to different values of compression damping parameter C while the rebound damping parameter R is held constant, specifically having R=12. The horizontal axis represents the piston rod velocity in m/s. The vertical axis represents the damping force in N.

Two groups of curves are shown in FIG. 10, a lower group and an upper group. The lower group represents compression damping force characteristics for different values of compression damping parameter C. The relationship between piston rod velocity and damping force is shown for the following values of compression damping parameter C: 15, 2; 15, 4; 15, 8; 15, 14; and 15, 24. As can be seen in FIG. 10, the damping force varies for the different values of the compression damping parameter C.

The upper group represents the rebound damping force characteristics for different values of compression damping parameter C and rebound damping parameter R. The relationship between piston rod velocity and compression damping force is shown for the following values of compression damping parameter C: 15, 2; 15, 8; and 15, 24. As can be seen in FIG. 10, although compression damping force characteristics have been adjusted, the rebound damping force characteristics does not change in any significant way.

Figure 11:
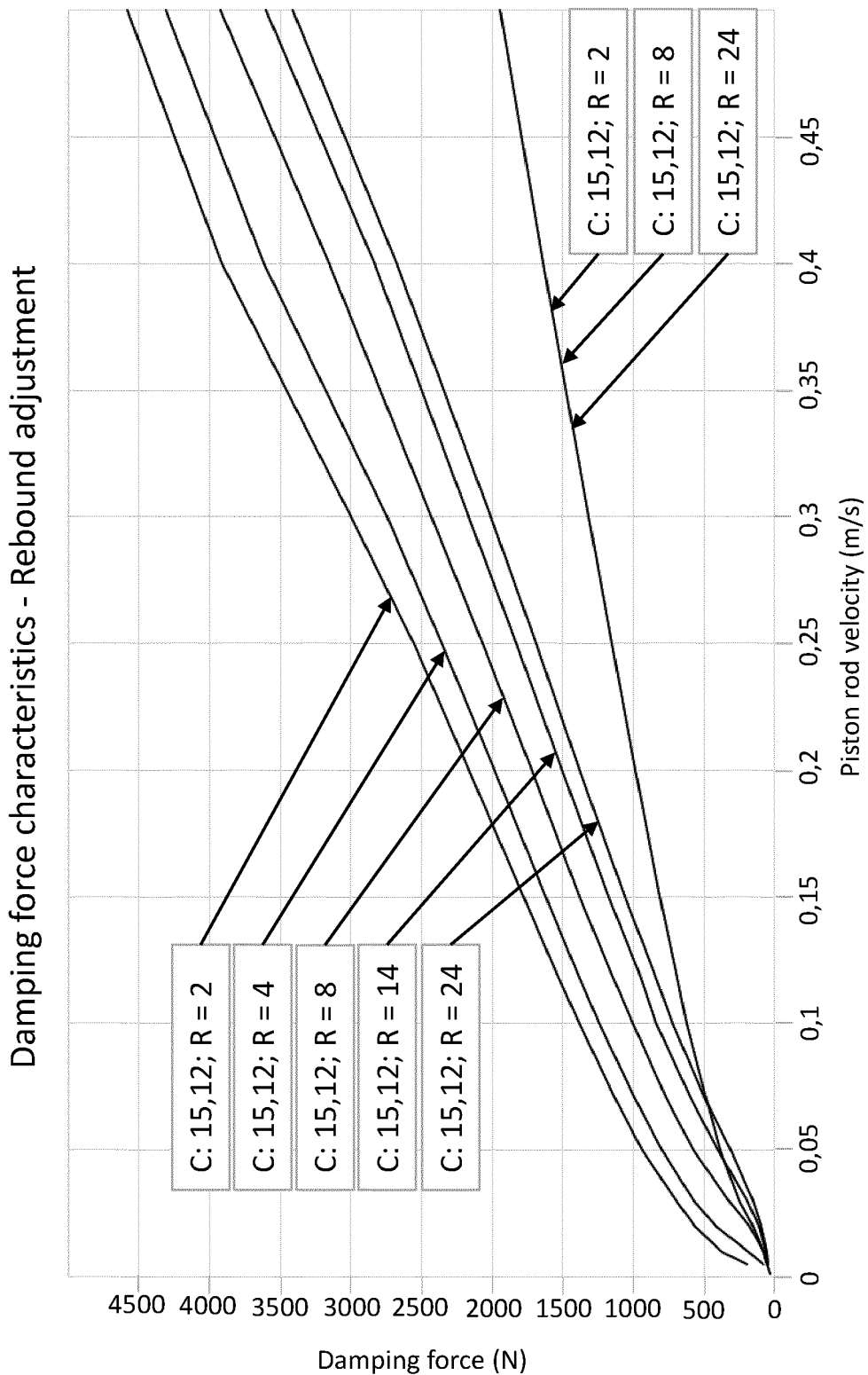
FIG. 11 shows damping force characteristics during compression strokes and rebound strokes in relation to rebound adjustments of the adjustable bleed valve according to one embodiment of the disclosure.

In a similar manner, the FIG. 11 shows damping force characteristics during compression strokes and rebound strokes while the compression damping parameter C is held constant, specifically having C=15, 12. As before, the horizontal axis represents the piston rod velocity in m/s. The vertical axis represents the damping force in N.

Two groups of curves are shown in FIG. 11, a lower group and an upper group. The upper group represents the rebound damping force characteristics for different values of rebound damping parameter R. The relationship between piston rod velocity and rebound damping force is shown for the following values of rebound damping parameter R: 2, 4, 8, 14, and 24. As can be seen in FIG. 11, the rebound damping force varies for the different values of the rebound damping parameter R. The lower group represents the compression damping force characteristics for different values of rebound damping parameter R. The relationship between piston rod velocity and compression damping force is shown for the following values of rebound damping parameter R: 2; 8; and 24. As can be seen in FIG. 11, although rebound damping force characteristics have been adjusted, the compression damping force characteristics does not change in any significant way.

Hence, the adjustable bleed valve assembly of the present disclosure enables, be means of the two serially adjustable bleed valves, adjustment of compression damping force without impacting the rebound damping force in any significant way. Likewise, it enables adjustment of rebound damping force without impacting the compression damping force in any significant way.

Figure 12:
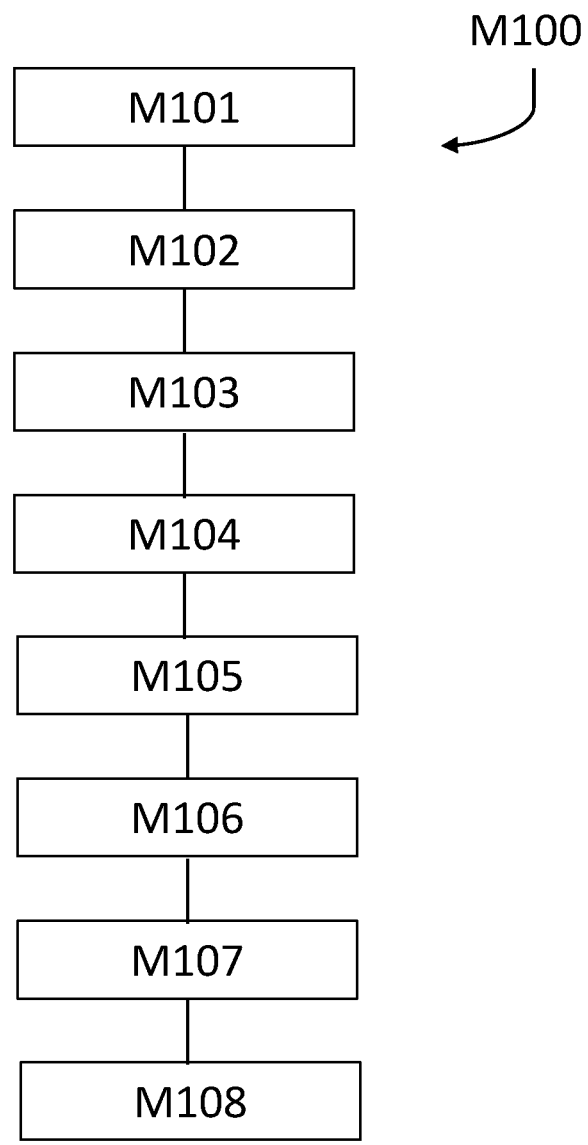
FIG. 12 shows a flow chart of a method for adjusting the adjustable bleed valve assembly.

FIG. 12 shows a method M100 for adjusting the adjustable bleed valve assembly 1 according to one embodiment of the disclosure. The method M100 comprises a step M101 of actuating at least one of the first and second adjustable bleed valves 10, 20 between the first open state O1 and the second open state O2, or between an open state O1, O2 and a closed state, so as to achieve a desired damping force characteristic during compression strokes and/or rebound strokes. Both the first and second adjustable bleed valves 10, 20 between the first open state O1 and the second open state O2, or between an open state O1, O2 and a closed state, respectively, so as to achieve a desired damping force characteristic during compressions strokes and/or rebound strokes.

Furthermore, the method M100 comprises a step M102 of actuating the first and second adjustable bleed valves 10, 20 between the first open state O1 and the second open state O2, or between an open state O1, O2 and a closed state, respectively, independently from each other.

The method M100 comprises a step M103 of moving a throttling member 50 relative a first bleed valve member 11 of the first adjustable bleed valve 10 so as to adjustably cover at least a portion of one or more bleed flow throttling openings 11b associated with the first adjustable bleed valve 10.

The method M100 comprises a step M104 of moving a second bleed valve member 21 of the second adjustable bleed valve 20 relative the throttling member 50 so as to adjustably cover at least a portion of one or more bleed flow throttling openings 21b associated with the second adjustable bleed valve 20. The method M100 comprises a step M105 of holding the throttling member 50 fixed relative the first bleed valve member 11 of the first adjustable bleed valve 10 when adjusting the second adjustable bleed valve 20.

The method M100 comprises a step M106 of holding the second bleed valve member 21 fixed relative the throttling member 50 when adjusting the first adjustable bleed valve 10.

The method M100 comprises a step M107 of opening a compression check valve at a predetermined damping fluid pressure.

The method M100 comprises a step M108 of opening a rebound check valve at a predetermined damping fluid pressure.

In the drawings and specification, there have been disclosed example embodiments and examples of the disclosure and, although specific terms are employed, they are used in a generic and descriptive sense only and not for the purpose of limitation, the scope of the disclosure being set forth in the following claims.

The invention claimed is:

1. A bleed valve assembly for arrangement in a bleed flow channel in a piston rod of a shock absorber, the bleed valve assembly comprising:
   a first adjustable bleed valve, and
   a second adjustable bleed valve arranged in series with the first adjustable bleed valve,
   the first adjustable bleed valve being reconfigurable during use independently from a pressure acting on the first adjustable bleed valve, the second adjustable bleed valve being reconfigurable during use independently from a pressure acting on the second adjustable bleed valve, the first adjustable bleed valve being adjustable between a first open state and a second open state, or between said first open state and a closed state, and the second adjustable bleed valve being adjustable between a first open state and a second open state, or between said first open state and a closed state,
   each adjustable bleed valve being adapted to throttle a damping fluid in the piston rod more in the second open state than in the first open state,
   the first adjustable bleed valve and the second adjustable bleed valve being each adjustable between the first open state and the second open state or between said first open state and said closed state independently from one another,
   the first adjustable bleed valve and the second adjustable bleed valve being adapted to throttle a damping fluid by means of a common throttling member, and
   the first adjustable bleed valve being adjustable between the first open state and the second open state or between said first open state and said closed state by moving the throttling member.

2. The bleed valve assembly according to claim 1, wherein the second adjustable bleed valve comprises a second bleed valve member adapted to interact with the throttling member such that the throttling member adjustably covers at least a portion of one or more bleed flow throttling openings associated with the second adjustable bleed valve.

3. The bleed valve assembly according to claim 2, wherein the throttling member is coupled to a first adjusting means by means of a first coupling member adapted to enable adjustment of the position of the throttling member relative to the first bleed valve member.

4. The bleed valve assembly according to claim 3, wherein the second bleed valve member is slidably arranged in the first coupling member.

5. The bleed valve assembly according to claim 2, wherein the second bleed valve member is held fixed relative to the throttling member when the first adjustable bleed valve is adjusted between the first open state and the second open state or between said first open state and said closed state.

6. The bleed valve assembly according to claim 2, wherein the second bleed valve member is coupled to a second adjusting means by means of a second coupling member adapted to enable adjustment of the position of the second bleed valve member relative to the throttling member.

7. The bleed valve assembly according to claim 2, wherein the throttling member, the first bleed valve member and the second bleed valve member are concentrically arranged.

8. The bleed valve assembly according to claim 1, comprising a compression check valve adapted to open at a predetermined damping fluid pressure during compression.

9. The bleed valve assembly according to claim 8, wherein the rebound check valve or the compression check valve respectively is adapted to open from an open state to a further open state.

10. The bleed valve assembly according to claim 1, wherein the first adjustable bleed valve and the second adjustable bleed valve are adjustable between the first open state and the second open state, or between said first open state and said closed state, from a distance.

11. The bleed valve assembly according to claim 1, wherein the first adjustable bleed valve comprises a first bleed valve member adapted to interact with the throttling member such that the throttling member adjustably covers at least a portion of one or more bleed flow throttling openings associated with the first adjustable bleed valve.

12. The bleed valve assembly according to claim 1, wherein the throttling member is held fixed relative to the first bleed valve member when the second adjustable bleed valve is adjusted between the first open state and the second open state or between said first open state and said closed state.

13. The bleed valve assembly according to claim 1, comprising a rebound check valve adapted to open at a predetermined damping fluid pressure during rebound.

14. A method of adjusting an adjustable bleed valve assembly, the adjustable bleed valve having:
a first adjustable bleed valve, and
a second adjustable bleed valve arranged in series with the first adjustable bleed valve,
the first adjustable bleed valve being reconfigurable during use independently from a pressure acting on the first adjustable bleed valve, the second adjustable bleed valve being reconfigurable during use independently from a pressure acting on the second adjustable bleed valve, the first adjustable bleed valve being adjustable between a first open state and a second open state or between said first open state and a closed state, and the second adjustable bleed valve being adjustable between a first open state and a second open state or between said first open state and a closed state,
each adjustable bleed valve being adapted to throttle a damping fluid in the piston rod more in the second open state than in the first open state,
the first adjustable bleed valve and the second adjustable bleed valve being each adjustable between the first open state and the second open state or between said first open state and said closed state independently from one another,
the first adjustable bleed valve and the second adjustable bleed valve being adapted to throttle a damping fluid by means of a common throttling member, and
the first adjustable bleed valve being adjustable between the first open state and the second open state or between said first open state and said closed state by moving the throttling member,
the method comprising a step of actuating at least one of the first and second adjustable bleed valves between the first open state and the second open state, or between said first open state and said closed state, so as to achieve a desired damping force characteristic during compression strokes and/or rebound strokes.

15. The method according to claim 14, comprising a step of actuating the first and second adjustable bleed valves between the first open state and the second open state, or between said first open state and said closed state, respectively, independently from each other.

16. The method according to claim 14, comprising a step of moving a throttling member relative to a first bleed valve member of the first adjustable bleed valve so as to adjustably cover at least a portion of one or more bleed flow throttling openings associated with the first adjustable bleed valve.

17. The method according to claim 14, comprising a step of moving a second bleed valve member of the second adjustable bleed valve relative to the throttling member so as to adjustably cover at least a portion of one or more bleed flow throttling openings associated with the second adjustable bleed valve.

18. The method according to claim 14, comprising a step of holding the throttling member fixed relative to the first bleed valve member of the first adjustable bleed valve when adjusting the second adjustable bleed valve.

19. The method according to claim 14, comprising a step of holding the second bleed valve member fixed relative to the throttling member when adjusting the first adjustable bleed valve, and/or a step of opening a compression check valve at a predetermined damping fluid pressure, and/or a step of opening a rebound check valve at a predetermined damping fluid pressure.

20. A shock absorber comprising:
a piston rod comprising a bleed flow channel, and
a bleed valve assembly arranged in said bleed flow channel, the bleed valve comprising:
a first adjustable bleed valve, and
a second adjustable bleed valve arranged in series with the first adjustable bleed valve,
the first adjustable bleed valve being reconfigurable during use independently from a pressure acting on the first adjustable bleed valve, the second adjustable bleed valve being reconfigurable during use independently from a pressure acting on the second adjustable bleed valve, the first adjustable bleed valve being adjustable between a first open state and a second open state or between said first open state and a closed state, and the second adjustable bleed valve being adjustable between a first open state and a second open state or between said first open state and a closed state,
each adjustable bleed valve being adapted to throttle a damping fluid in the piston rod more in the second open state than in the first open state, the first adjustable bleed valve and the second adjustable bleed valve being each adjustable between the first open state and the second open state or between said first open state and said closed state independently from one another, the first adjustable bleed valve and the second adjustable bleed valve being adapted to throttle a damping fluid by means of a common throttling member, and the first adjustable bleed valve being adjustable between the first open state and the second open state or between said first open state and said closed state by moving the throttling member.

* * * * *